(12) United States Patent
Matoba

(10) Patent No.: US 6,252,815 B1
(45) Date of Patent: Jun. 26, 2001

(54) FIRST IN FIRST OUT MEMORY CIRCUIT

(75) Inventor: Kenjiro Matoba, Miyazaki (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/488,561

(22) Filed: Jan. 21, 2000

Related U.S. Application Data

(62) Division of application No. 09/296,396, filed on Apr. 23, 1999.

(30) Foreign Application Priority Data

Apr. 24, 1998 (JP) .................................................. 10-115378

(51) Int. Cl.[7] .................................................. G11C 7/00
(52) U.S. Cl. .................................... 365/221; 365/230.04
(58) Field of Search .............................. 365/221, 230.04, 365/230.03, 230.05

(56) References Cited

U.S. PATENT DOCUMENTS

| 4,535,427 | 8/1985 | Jiang . | |
|---|---|---|---|
| 5,289,310 | * 2/1994 | Park | 358/443 |
| 5,696,940 | * 12/1997 | Liu et al. | 395/481 |
| 6,026,473 | * 2/2000 | Cross et al. | 711/157 |

FOREIGN PATENT DOCUMENTS

| 0 260 897 | 3/1988 | (EP) . |
|---|---|---|
| 63-183679 | 7/1988 | (JP) . |
| 30156788 | 7/1991 | (JP) . |
| 4-306755 | 10/1992 | (JP) . |
| 6-259956 | 9/1994 | (JP) . |
| 8-124376 | 5/1996 | (JP) . |

* cited by examiner

*Primary Examiner*—Richard Elms
*Assistant Examiner*—VanThu Nguyen
(74) *Attorney, Agent, or Firm*—Jones Volentine, LLC

(57) ABSTRACT

A first-in, first-out memory circuit includes first and second memory part respectively having first and second address locations each of which has a first word length, a write address counter outputting a write address signal and a memory part selection signal to the first and second memory parts in response to a word length selection signal, and a memory part enable circuit which is coupled between the write address counter and the first and second memory parts and receives the memory part selection signal. The memory circuit also includes a data bus which is applied with the input data and which includes a first data bus having the first word length and a second data bus having the first word length, and a data input part which is coupled between the data bus and the first and second memory parts.

6 Claims, 23 Drawing Sheets

BUS16/8=L

| A4 | A3 | A2 | A1 | A0 (LSB) | Equivalent Address |
|----|----|----|----|----------|--------------------|
| 0 | 0 | 0 | 0 | 0 | 0000 |
| 0 | 0 | 0 | 0 | 1 | 0000 |
| 0 | 0 | 0 | 1 | 0 | 0001 |
| 0 | 0 | 0 | 1 | 1 | 0001 |
| 0 | 0 | 1 | 0 | 0 | 0010 |
| 0 | 0 | 1 | 0 | 1 | 0010 |
| 0 | 0 | 1 | 1 | 0 | 0011 |
| 0 | 0 | 1 | 1 | 1 | 0011 |

FIG.4(a)

BUS16/8=H

| A4 | A3 | A2 | A1 | A0 (LSB) | Equivalent Address |
|----|----|----|----|----------|--------------------|
| 0 | 0 | 0 | 0 | 1 | 0000 |
| 0 | 0 | 0 | 1 | 1 | 0001 |
| 0 | 0 | 1 | 0 | 1 | 0010 |
| 0 | 0 | 1 | 1 | 1 | 0011 |
| 0 | 1 | 0 | 0 | 1 | 0100 |
| 0 | 1 | 0 | 1 | 1 | 0101 |
| 0 | 1 | 1 | 0 | 1 | 0110 |
| 0 | 1 | 1 | 1 | 1 | 0111 |

FIG.4(b)

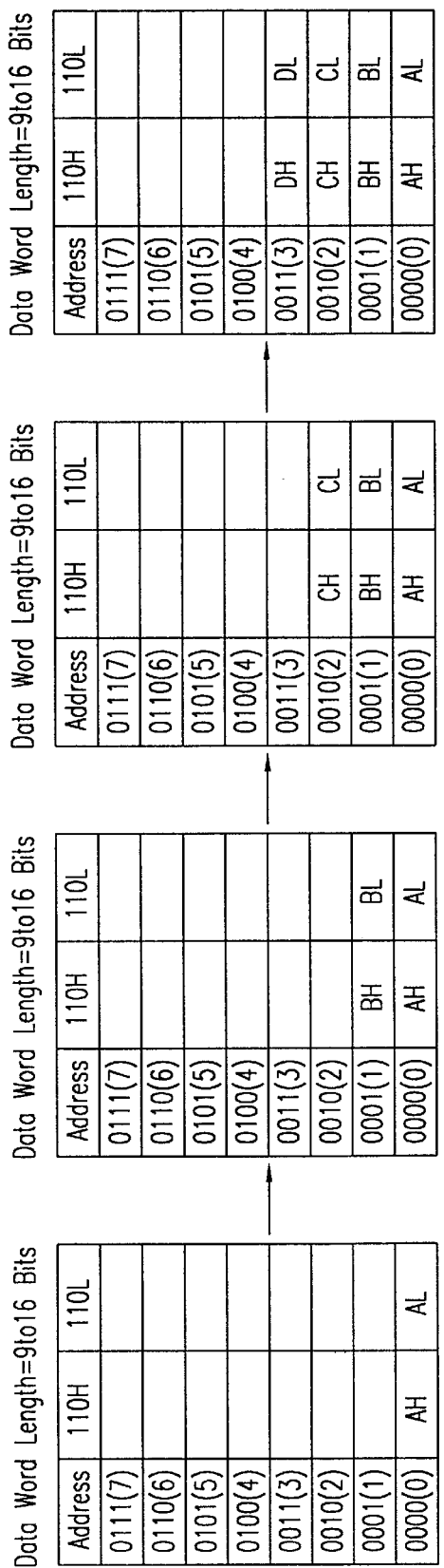

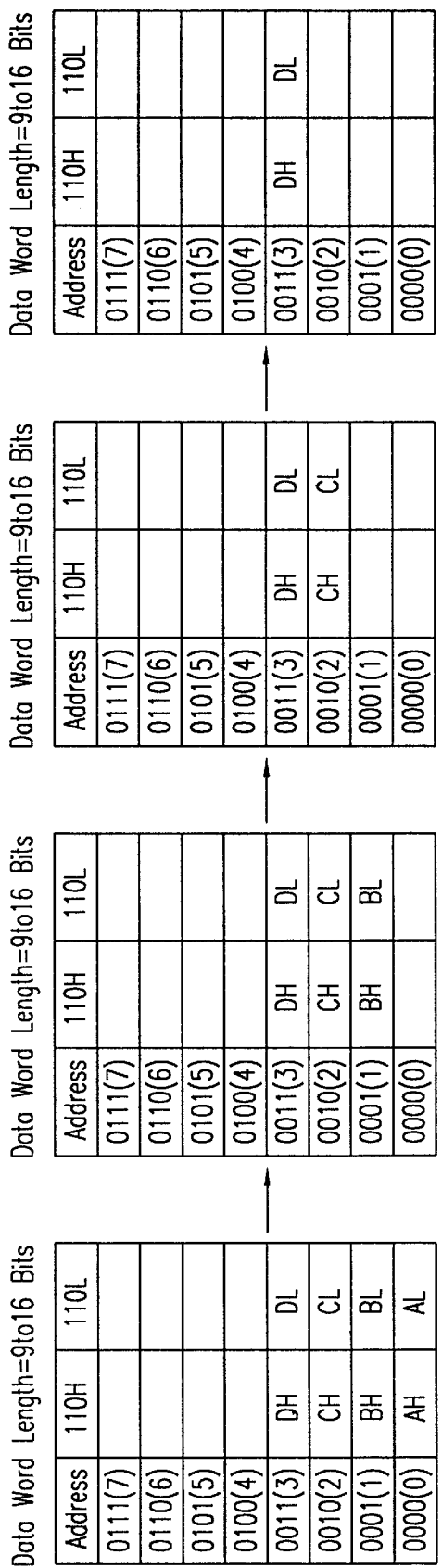

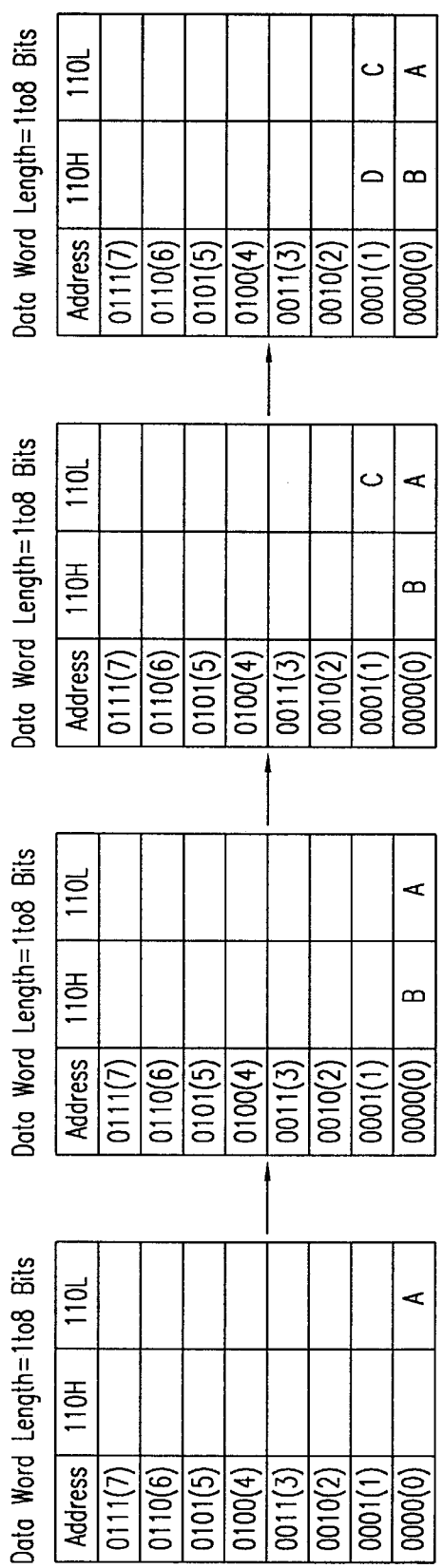

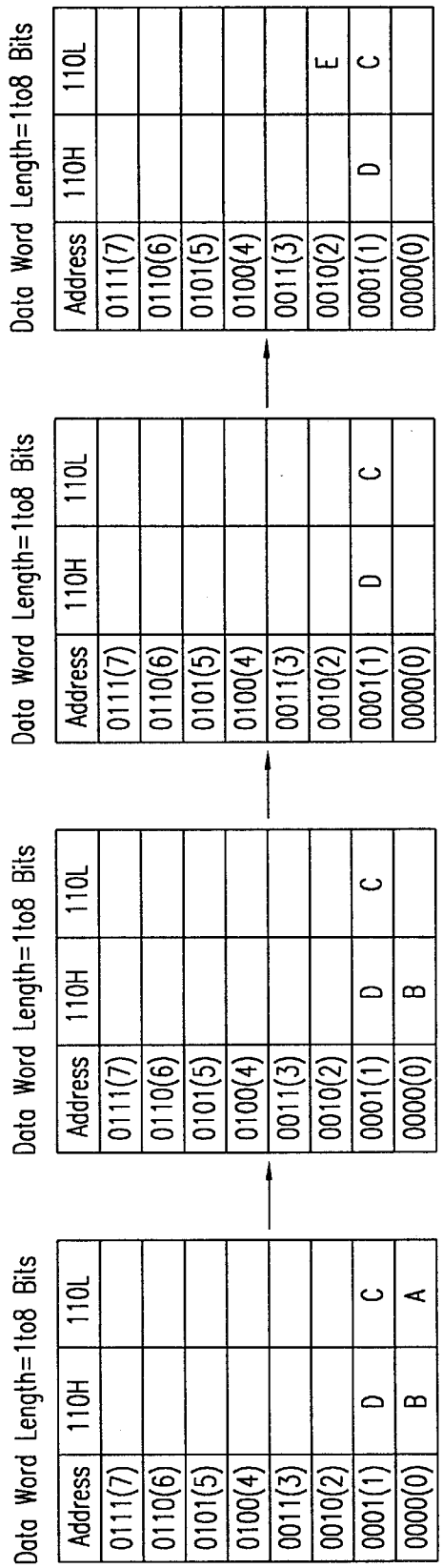

M/S=H

| A4 | A3 | A2 | A1 | A0 (LSB) | Equivalent Address |
|---|---|---|---|---|---|
| 0 | 0 | 0 | 0 | 0 | 0000 |
| 0 | 0 | 0 | 0 | 1 | 0000 |
| 0 | 0 | 0 | 1 | 0 | 0001 |
| 0 | 0 | 0 | 1 | 1 | 0001 |
| 0 | 0 | 1 | 0 | 0 | 0010 |
| 0 | 0 | 1 | 0 | 1 | 0010 |
| 0 | 0 | 1 | 1 | 0 | 0011 |
| 0 | 0 | 1 | 1 | 1 | 0011 |

| A4 | A3 | A2 | A1 | A0 (LSB) | Equivalent Address |
|---|---|---|---|---|---|
| 0 | 0 | 0 | 0 | 0 | 0000 |
| 0 | 0 | 0 | 0 | 1 | 0001 |
| 0 | 0 | 1 | 0 | 0 | 0010 |
| 0 | 0 | 1 | 0 | 1 | 0010 |
| 0 | 1 | 0 | 0 | 0 | 0100 |
| 0 | 1 | 0 | 0 | 1 | 0100 |
| 0 | 1 | 1 | 0 | 0 | 0110 |
| 0 | 1 | 1 | 0 | 1 | 0110 |

| A4 | A3 | A2 | A1 | A0 (LSB) | Equivalent Address |
|---|---|---|---|---|---|
| 0 | 0 | 0 | 0 | 0 | 0000 |
| 0 | 0 | 0 | 0 | 1 | 0000 |
| 0 | 0 | 0 | 1 | 0 | 0001 |
| 0 | 0 | 0 | 1 | 1 | 0001 |
| 0 | 0 | 1 | 0 | 0 | 0010 |
| 0 | 0 | 1 | 0 | 1 | 0010 |
| 0 | 0 | 1 | 1 | 0 | 0011 |
| 0 | 0 | 1 | 1 | 1 | 0011 |

| A4 | A3 | A2 | A1 | A0 (LSB) | Equivalent Address |
|---|---|---|---|---|---|
| 0 | 0 | 0 | 1 | 0 | 0001 |
| 0 | 0 | 0 | 1 | 1 | 0001 |
| 0 | 0 | 1 | 1 | 0 | 0011 |
| 0 | 0 | 1 | 1 | 1 | 0011 |
| 0 | 1 | 0 | 1 | 0 | 0101 |
| 0 | 1 | 0 | 1 | 1 | 0101 |
| 0 | 1 | 1 | 1 | 0 | 0111 |
| 0 | 1 | 1 | 1 | 1 | 0111 |

FIG.15(b)

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | | |
| 0001(1) | | |
| 0000(0) | | A |

FIG.16(a)

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | | |
| 0001(1) | | |
| 0000(0) | B | A |

FIG.16(b)

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | | |
| 0001(1) | | C |
| 0000(0) | B | A |

FIG.16(c)

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | | |
| 0001(1) | D | C |
| 0000(0) | B | A |

FIG.16(d)

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | | |
| 0001(1) | D | C |
| 0000(0) | B | A |

FIG.17(a)

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | | |
| 0001(1) | D | C |
| 0000(0) | B | |

FIG.17(b)

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | | |
| 0001(1) | D | C |
| 0000(0) | | |

FIG.17(c)

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | | |
| 0001(1) | D | |
| 0000(0) | | |

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | | |
| 0001(1) | | |
| 0000(0) | | L1 |

FIG.18(b)

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | | |
| 0001(1) | | |
| 0000(0) | L2 | L1 |

FIG.18(c)

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | | L3 |
| 0001(1) | | |
| 0000(0) | L2 | L1 |

FIG.18(d)

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | L4 | L3 |
| 0001(1) | | |
| 0000(0) | L2 | L1 |

FIG.18(e)

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | L4 | L3 |
| 0001(1) | | R1 |
| 0000(0) | L2 | L1 |

FIG.18(f)

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | L4 | L3 |
| 0001(1) | R2 | R1 |
| 0000(0) | L2 | L1 |

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | L4 | L3 |
| 0001(1) | R2 | R1 |
| 0000(0) | L2 | L1 |

FIG.19(a)

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | L4 | L3 |
| 0001(1) | R2 | R1 |
| 0000(0) | | L2 |

FIG.19(b)

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | L4 | L3 |
| 0001(1) | R2 | R1 |
| 0000(0) | | |

FIG.19(c)

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | L4 | L3 |
| 0001(1) | | R2 |
| 0000(0) | | |

FIG.19(d)

| Address | Upper Bits | Lower Bits |
|---|---|---|
| 0111(7) | | |
| 0110(6) | | |
| 0101(5) | | |
| 0100(4) | | |
| 0011(3) | | |
| 0010(2) | L4 | L3 |
| 0001(1) | | |
| 0000(0) | | |

FIG.19(e)

| Address | Upper Bits | Lower Bits |
|---|---|---|
| 0111(7) | | |
| 0110(6) | | |
| 0101(5) | | |
| 0100(4) | | |
| 0011(3) | | R3 |
| 0010(2) | L4 | L3 |
| 0001(1) | | |
| 0000(0) | | |

FIG.19(f)

FIRST IN FIRST OUT MEMORY CIRCUIT

CROSS REFERENCE TO RELATED APPLICATIONS

This is a divisional application of application Ser. No. 09/296,396, filed Apr. 23, 1999, which is hereby incorporated by reference in its entirety for all purposes.

BACKGROUND OF THE INVENTION

1. Field of the Invention

The present invention generally relates to a first-in, first-out memory circuit, more particularly, to a first-in, first-out memory circuit using a dual port random access memory.

This application is a counterpart of Japanese patent application, Serial Number 115378/1998, filed Apr. 24, 1998, the subject matter of which is incorporated herein by reference.

2. Description of the Related Art

A conventional first-in, first-out memory circuit (hereinafter FIFO memory) using a dual port RAM is shown in FIG. 21. The conventional FIFO memory 500 is mainly made up of a dual port RAM 510, a write address counter 520 (an address counter for writing data), a read address counter 530 (an address counter for reading data), a coincidence detect circuit 540.

The dual port RAM 510 has a data write terminal 510W for receiving a data write signal WR, a write address terminal 510WA for receiving a write address signal, a data input port 510I for inputting data, a data read terminal 510R for receiving a data read signal RD, a read address terminal 510RA for receiving a read address signal, and a data output port 510O for outputting data.

The write address counter 520 has a clock input terminal 520CL which receives the data write signal WR. The write address counter 520 outputs the write address signal to the write address terminal 510WA of the dual port RAM 510 and an input terminal 540I1 of the coincidence detect circuit 540. An explanation of the coincidence detect circuit 540 is provided later.

The read address counter 530 has a clock input terminal 530CL which receives the data read signal RD. The read address counter 530 outputs the read address signal to the read address terminal 510RA of the dual port RAM 510 and an input terminal 540I2 of the coincidence detect circuit 540.

The coincidence detect circuit 540 has a clock input terminal 540CL1 which receives the data write signal WR and a clock input terminal 540CL2 which receives the data read signal RD. The coincidence detect circuit 540 recognizes the state of the dual port RAM 510 according to the data write signal WR, the data read signal RD, the write address signal and the read address signal and outputs a FUL signal or a EMP signal. The FUL signal and the EMP signal will be explained later.

Next, an operation of the FIFO memory circuit 500 will be explained hereinafter with reference to FIG. 22 and FIG. 23.

FIG. 22 is a timing chart showing an operation of the FIFO memory 500.

FIG. 23 is a flow diagram indicating data storing states of the dual port RAM 510. As illustrated in FIG. 22, the dual port RAM 510 has eight addresses therein.

First, when the data write signal WR (data write pulse) is not transferred to the FIFO memory 500 and the data write signal WR is in an L level, the write address counter 520 does not count. Thus, no data are written into the dual port RAM 510 at this time. Thereafter, when the data write signal WR is transferred to the FIFO memory 500, the data can be written into the addresses of the dual port RAM 510 as indicated by the write address counter 520. Whenever writing the data into the dual port RAM 510 is executed, the address in which the write address counter 520 indicates is increased by one. (Refer to from time t0 to time t1 shown in FIG. 23)

When eight data write pulses WR are inputted to the FIFO memory 500 while the data read signal RD (data read pulse) is never inputted once to them, the data are written into all addresses in the dual port RAM 510. (The circle in FIG. 23 indicates that the data is written into or stored in the corresponding addresses.) At this state, it is necessary to execute a predetermined operation so that the data can not be written any more into the dual port RAM 510. In order to carry out that operation, the coincidence detect circuit 540 outputs the FUL signal having an H level when the address signal output from the write address counter 520 coincides with the address signal output from the read address counter 530. (Refer to from time t1 shown in FIG. 23)

After that, when the data read pulse RD is transferred to the FIFO memory 500, the data stored in the address of the dual port RAM 510 as indicated by the read address counter 530 can be read out. In the case that the stored data is read out from this vacant address, this address where the stored data has been stored becomes vacant. Therefore, it is possible to write new data into this address again. The coincidence detect circuit 540 outputs the FUL signal having the L level when the address signal output from the write address counter 520 does not coincide with the address signal output from the read address counter 530. (Refer to from time t2 shown in FIG. 23)

Reading out the data is enabled by applying the data read pulse RD to the FIFO memory 500. The data located at the address indicated by the read address counter 530 can be read out. Whenever reading out the data from the dual port RAM 510 is executed, the address indicated by the read address counter 530 is increased by one. (Refer to from time t2 to time t3 in FIG. 23)

When eight data read pulses RD are inputted to the FIFO memory 500 while the data write pulse WR is never applied once to them, the data are read out from all addresses in the dual port RAM 510. At this state, it is necessary to execute a predetermined operation so that the data can not be read out any more from the dual port RAM 510. In order to carry out this operation, the coincidence detect circuit 540 outputs the EMP signal having the H level when the address signal output from the read address counter 530 coincides with the address signal output from the write address counter 520. (Refer to time t3 shown in FIG. 23)

After that, when the data write pulse WR is transferred to the FIFO memory 500, the data can be written into the address where the write address counter 520 indicates. When the data is written into this address, it is possible to read out the data from this address again. The coincidence detect circuit 540 outputs the EMP signal having the L level when the address signal output from the read address counter 530 does not coincide with the address signal output from the write address counter 520. (Refer to time t4 shown in FIG. 23)

The conventional FIFO memory can treat a single kind of data such as data comprised of 8 bits. However, it is difficult to deal with two or more kinds of data.

The conventional FIFO memory can handle a data interface dealing with a single channel, however, it is difficult to change the specification thereof in order to handle a data interface dealing with multiple channels.

Consequently, there has been a need for an improved FIFO memory circuit.

SUMMARY OF THE INVENTION

It is an object of the present invention is to provide a first-in, first-out memory that may deal with plural kinds of data.

It is another object of the present invention is to provide a first-in, first-out memory that may handle a data interface dealing with multiple channel.

According to one aspect of the present invention, for achieving the above object, there is provided a first-in, first-out memory circuit for storing data according to a data length of an input data applied to a data bus.

The memory circuit includes a first memory part and a second memory part. The first memory part has a plurality of first address locations each having a first word length and each storing a data therein in response to an enable signal and a write address signal, and has a first input port for receiving the input data applied to the data bus and a first output port for outputting the data stored in the first address locations.

The second memory part has a plurality of second address locations each having the first word length and each storing a data therein in response to the enable signal and the write address signal, and has a second input port for receiving the input data applied to the data bus and a second output port for outputting the data stored in the second address locations, wherein each of the second address locations corresponds to the respective first address locations.

The memory circuit also includes a write address counter which outputs the write address signal designating the first and second address locations and a memory part selection signal to said first and second memory parts in response to a word length selection signal, wherein the word length selection signal has a first voltage level in a first data mode in which the data length of the input data is not greater than the first word length and a second voltage level in a second data mode in which the data length of the input data is greater than the first word length, a memory part enable circuit, coupled between the write address counter and the first and second memory parts, which receives the memory part selection signal and the word length selection signal, which outputs the enable signal to the first and second memory parts alternately in the first data mode, and which outputs the enable signal to the first and second memory parts simultaneously in the second data mode.

The memory circuit further includes the data bus, applied with the input data, which includes a first data bus having the first word length and a second data bus having the first word length, and a data input part, coupled between the data bus and the first and second input ports, which transfers the input data applied to the second data bus to the first and second input ports in the first data mode, and which transfers the input data applied to the first and second data buses to the first and second input ports respectively in the second data mode.

The above and further objects and novel features of the invention will more fully appear from the following detailed description, appended claims and the accompanying drawings.

BRIEF DESCRIPTION OF THE DRAWINGS

FIG. 4(a) and FIG. 4(b) are truth tables of the output signal of the write address counter 120.

FIG. 5 is a table explaining the data writing scheme in the case where the input data word length ranges from 9 to 16 bits.

FIG. 6 is a table explaining the data reading scheme in the case where the input data word length ranges from 9 to 16 bits.

FIG. 7 is a table explaining the data writing scheme in the case where the input data word length ranges from 1 to 8 bits.

FIG. 8 is a table explaining the data reading scheme in the case where the input data word length ranges from 1 to 8 bits.

FIG. 12(a) and FIG. 12(b) are truth tables of the output signal of the left channel write address counter 220L.

FIG. 15(a) and FIG. 15(b) are truth tables of the output signal of the right channel write address counter 220R.

FIG. 16 is a table explaining the data writing scheme in the case where the input data is one channel.

FIG. 17 is a table explaining the data reading scheme in the case where the input data is comprised of one channel type.

FIG. 18 is a table explaining the data writing scheme in the case where the input data is two channels type.

FIG. 19 is a table explaining the data reading scheme in the case where the input data is comprised of two channels type.

DETAILED DESCRIPTION OF THE PREFERRED EMBODIMENTS

First Embodiment

Figure 1:
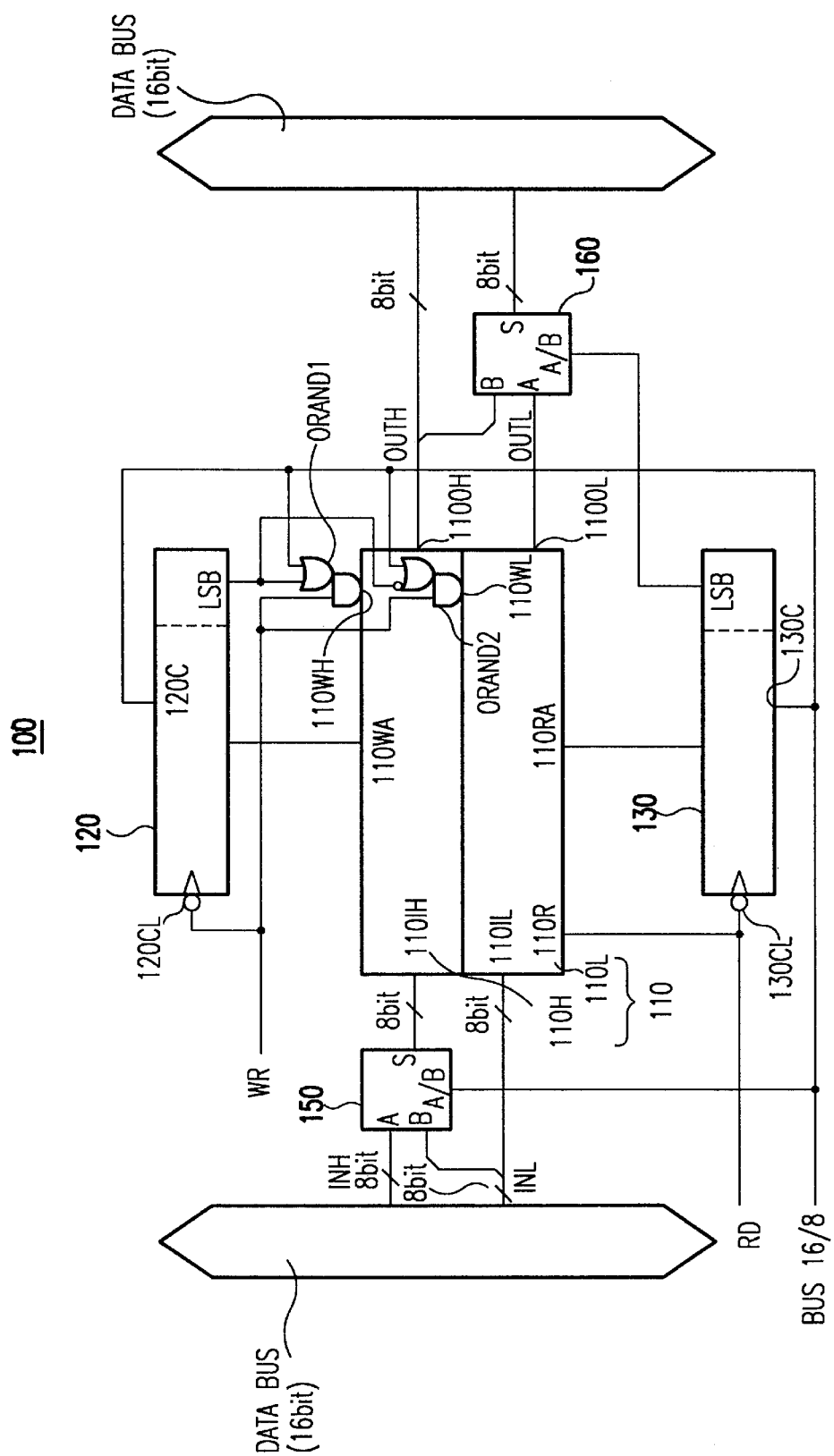
FIG. 1 is a block diagram showing a FIFO memory according to the first preferred embodiment of the present invention.

A first-in, first-out memory (hereinafter FIFO memory) according to the present invention will be explained hereinafter with reference to the figures. In order to simplify explanations, like elements are given like or corresponding reference numerals through this specification and figures. Dual explanations of the same elements are avoided.

FIG. 1 is a block diagram showing a FIFO memory according to the first preferred embodiment of the present invention.

Main features of the FIFO memory 100 are explained as follows.

First, a word length selection signal BUS 16/8 is provided in the FIFO memory 100. The word length selection signal BUS 16/8 changes the way of data writing and data reading in response to the data word length of an input data.

Second, the memory region (location) of a dual port RAM 110 is separated into an upper bits region 110H and a lower bits region 110L. Thus when the word length of the input data is lower than a predetermined length, the input data is alternately written into the upper bits region 110H and the lower bits region 110L. Therefore, a time period for storing data is increased and an access frequency to an external circuit, for example microprocessor, is decreased.

In the preferred embodiment, the dual port RAM 110 has the upper bits region 110H and the lower bits region 110L. However, while the dual port RAM 110 is described as having a memory region divided into two memory regions, the present invention is not limited to such this structure.

Furthermore, the upper bits region 110H and the lower bits region 110L, each of which is comprised of 8 bits, are explained as having separated memory regions. However, the present invention is not limited to such this structure.

Turning to FIG. 1, the FIFO memory 100 is mainly made up of the dual port RAM 110, a write address counter 120, a read address counter 130, a first selector 150, a second selector 160, an ORAND 1, and an ORAND 2.

The first selector 150 is a circuit which selects whether the inputting data should be written into the upper bits 110H or the lower bits 110L. The second selector 130 is a circuit which selects whether a data should be read out from the upper bits 110H or the lower bits 110L.

The ORAND 1 transfers a data write signal WR to the upper bits 110H of the dual port RAM 110. The ORAND 2 transfers the data write signal WR to the lower bits 110L of the dual port RAM 110.

The dual port RAM 110 includes the upper bits 110H and the lower bits 110L. The dual port RAM 110 also includes an upper bits write terminal 110WH for receiving the data write signal WR and outputting the received signal to the upper bits 110H, a lower bits write terminal 110WL for receiving the data write signal WR and outputting the received signal to the lower bits 110L, and a write address terminal 110WA for receiving a write address signal.

The dual port RAM 110 further includes an upper bits input port 110IH for transferring the input data to the upper bits 110H, a lower bits input port 110IL for transferring the input data to the lower bits 110L, and a read terminal 110R for receiving a data read signal RD.

The dual port RAM 110 further includes a read address terminal 110RA for receiving a read address signal, an upper bits output port 110OH for outputting the data stored in the upper bits 110H, and a lower bits output port 110OL for outputting the data stored in the lower bits 110L.

The write address counter 120 has a clock input terminal 120CL receiving the data write signal WR and output terminals outputting the write address signal. The least significant bit LSB of the write address signal (output signal of the write address counter 120) is output to the ORAND 1 and the ORAND 2 and the remaining bits are output to the write address terminal 110WA of the dual port RAM110.

Figure 2:
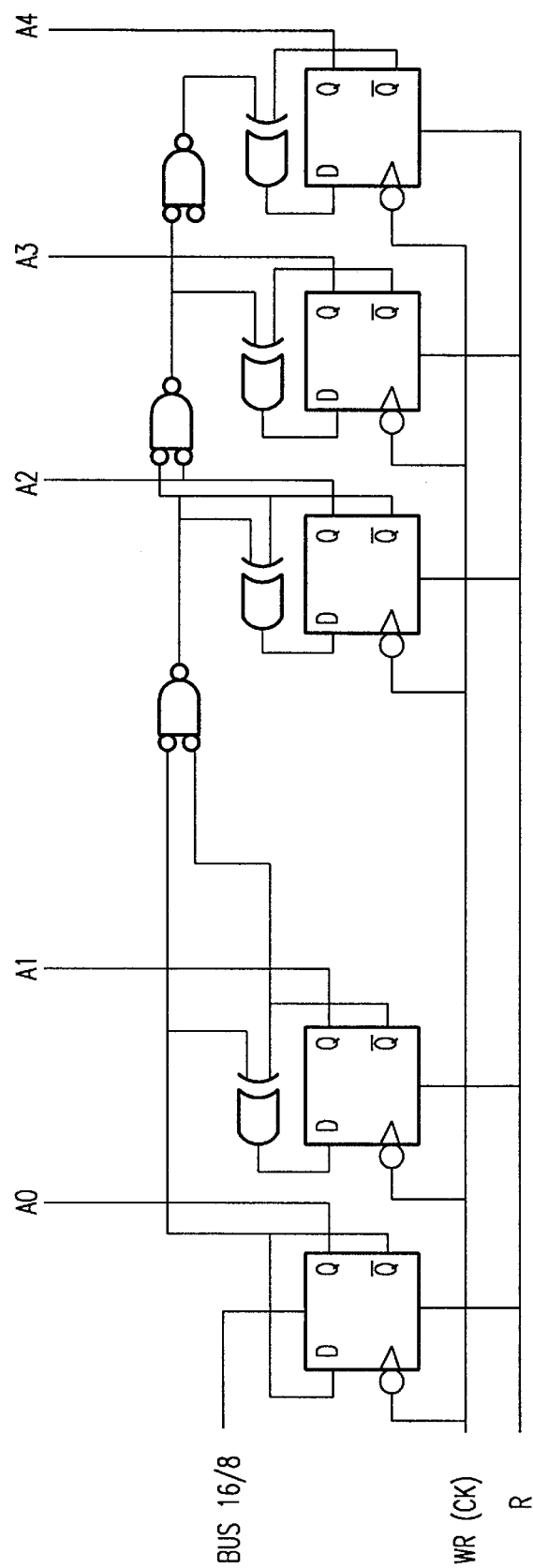
FIG. 2 is a circuit diagram showing a write address counter 120.

FIG. 2 is a detailed circuit diagram showing the write address counter 120.

The write address counter 120 is comprised of a plurality of flip flops and logic gates. The write address counter 120 outputs the write address signal as shown in FIG. 3 and FIG. 4 in response to the data write signal WR while a reset signal is in an L level.

Figure 3A:
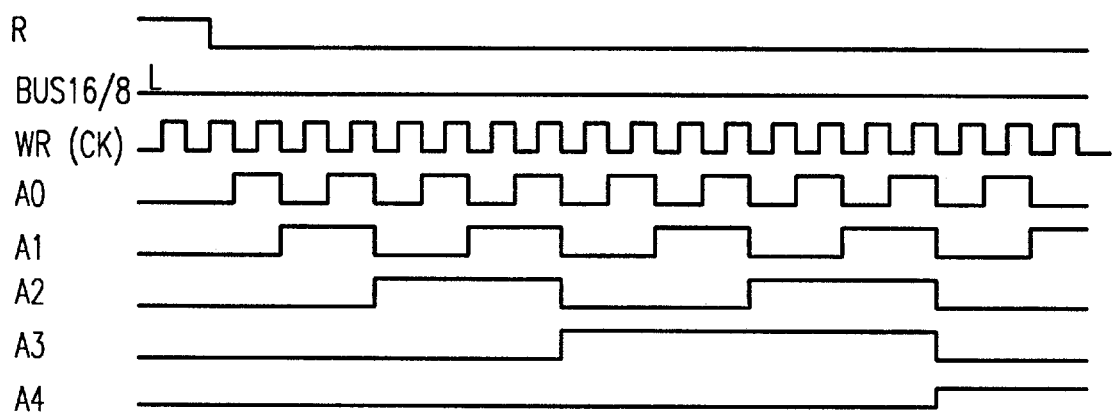
FIG. 3(a) and FIG. 3(b) are timing charts showing the write address counter 120.
Figure 3B:
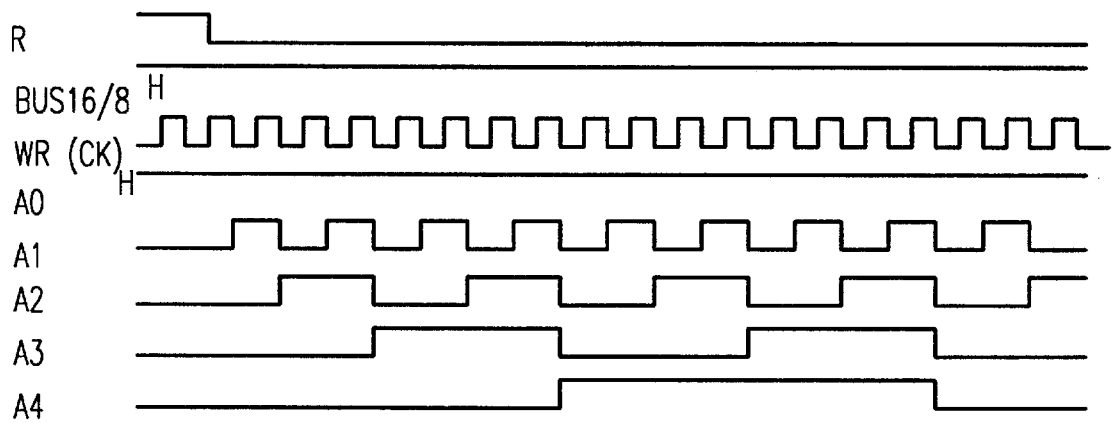

FIG. 3(a) and FIG. 3(b) are timing charts showing the write address counter 120. FIG. 3(a) shows the case where the word length selection signal BUS 16/8 is in an L level. On the other hand, FIG. 3(b) shows the case where the word length selection signal BUS 16/8 is in an H level.

FIG. 4(a) and FIG. 4(b) are truth tables of the output signal of the write address counter 120. FIG. 4(a) shows the case where the word length selection signal BUS 16/8 is in the L level. On the other hand, FIG. 4(b) shows the case where the word length selection signal BUS 16/8 is in the H level.

The read address counter 130 has a clock input terminal 130CL receiving the data read signal RD and output terminals outputting read address signal. The least significant bit LSB of the read address signal (output signal of the read address counter 130) is output to the second selector 160. The remaining bits are output to the read address terminal 110RA of the dual port RAM110. The detailed circuit diagram of the read address counter 130 is not shown, however, it is the same as the write address counter 120.

Next, the function of the word length selection signal BUS 16/8 is explained hereinafter.

The word length selection signal BUS 16/8 is a signal which indicates that the input data length ranges from 1 to 8 bits or ranges from 9 to 16 bits. The word length selection signal BUS 16/8 is applied to the first selector 150. The word length selection signal BUS 16/8 controls whether the first selector 150 selects the input upper bits INH on upper bits of data bus or the input lower bits INL on lower bits of data bus. That is, when the word length selection signal BUS 16/8 is in the H level, the first selector 150 selects a terminal A which receives the input upper bits INH. When the word length selection signal BUS 16/8 is in the L level, the first selector 150 selects a terminal B which receives the input lower bits INL.

An output signal of the first selector 150 is transferred to the upper bits input port 110IH. The input lower bits INL is applied to the terminal B and is also applied to the lower bits input port 110IL of the dual port RAM 110.

The least significant bit LSB of the read address counter 130 is applied to the second selector 160 and controls whether the second selector 160 selects an output upper bits OUTH or an output lower bits OUTL. That is, when the LSB of the read address counter 130 is in the H level, the second selector 160 selects a terminal A which receives the output lower bits OUTL. On the other hand, when the LSB of the read address counter 130 is in the L level, the second selector 160 selects a terminal B which receives the output upper bits OUTH. An output signal of the second selector 160 is output to lower bits of the data bus. The upper bits output port 110OH of the dual port RAM 110 is connected to the terminal B and is also connected to upper bits of the data bus.

The word length selection signal BUS 16/8 is also applied to an LSB control terminal 120C of the write address counter 120 and an LSB control terminal 130C of the read address counter 130. The word length selection signal BUS 16/8 controls the LSB of the write and read address counters. That is, as shown in FIG. 3(b) and FIG. 4(b), in the case where the word length selection signal BUS 16/8 is in the H level, the LSB of the write address counter 120 (or read address counter 130) is fixed to the H level. As shown in FIG. 3(a) and FIG. 4(a), in the case where the word length selection signal BUS 16/8 is in the L level, the LSB of the write address counter 120 (or read address counter 130) is alternately changed to the H or the L levels in response to the clock signal (data write signal WR or data read signal RD).

Furthermore, the word length selection signal BUS 16/8 is also used as a signal which determines whether the input data should be written into the upper bits 110H or the lower bits 110L in the dual port RAM 110.

The word length selection signal BUS 16/8 is inputted to one input terminal of an OR element of the ORAND 1. The LSB of the write address counter 120 is inputted to another input terminal of the OR element of the ORAND 1. Thus, the data write signal WR is transferred to the upper bit write address terminal 110WH through the ORAND 1 when the word length selection signal BUS 16/8 or the LSB of the write address counter 120 is in the H level.

The word length selection signal BUS 16/8 is also inputted to one input terminal of an OR element of the ORAND 2. The LSB of the write address counter 120 is inputted to another input terminal (inverted input terminal) of the OR element of the ORAND 2. Thus, the data write signal WR is transferred to the lower bit write address terminal 110WL through the ORAND 2 when the word length selection signal BUS 16/8 is in the H level or the LSB of the write address counter 120 is in the L level.

Next, an operation of the FIFO memory 100 of the first preferred embodiment will be explained hereinafter with reference to FIG. 1, FIG. 4 through FIG. 8.

(case 1: input data word length ranging from 9 to 16 bits)

(data write operation)

In the case where the input data has a word length ranging from 9 to 16 bits, the level of the word length selection signal BUS 16/8 is fixed to the H level. When the word length selection signal BUS 16/8 is in the H level, the selector 150 selects the terminal A. Therefore, the input upper bits INH (8 bits) of the input data (16 bits) is transferred to the upper bits 110H of the dual port RAM 110 through the selector 150. On the other hand, the input lower bits INL (8 bits) of the input data is directly transferred to the lower bits 110L of the dual port RAM 110.

As illustrated in FIG. 4(b), when the word length selection signal BUS 16/8 is in the H level, the write address counter 120 outputs A0 (LSB) having the H level. The ORAND 1 and the ORAND 2 are enabled by the H levels of these LSB. Accordingly, the data write signal WR (clock) is transferred to both the upper bits 110H and the lower bits 110L. Thus the upper bits 110H and the lower bits 110L are available to write.

The write address counter 120 sequentially outputs the address signal which is comprised of A1 through A4 (that is, "equivalent address" indicates these A1 through A4). Therefore, the input data are sequentially written into addresses designated by these address signals. The writing data scheme is illustrated in FIG. 5.

FIG. 5 is a table explaining the data writing scheme in the case where the input data word length ranges from 9 to 16 bits.

First, when the write address counter 120 outputs the address "0000" (the numeral which is put in the parenthesis is a numeral expressed by the decimal system) in response to the data write signal WR, the input lower bits AL are written into the address "0000" in the lower bits 110L and the input upper bits AH are written into the address "0000" in the upper bits 110H in the same time. (Refer to FIG. 5(a))

Next, the write address counter 120 outputs the address "0001" in response to the data write signal WR. Since the write address counter 120 outputs the "0001", the input lower bits BL which appear on the lower bits of data bus are written into the address "0001" in the lower bits 110L. The input upper bits BH which exist on the upper bits of data bus are also written into the address "0001" in the upper bits 110H in the same time. (Refer to FIG. 5(b))

Thereafter, the input data on the data bus CL, CH, DL and DH are written into the dual port RAM 110 in the same manner. (Refer to FIG. 5(c) and FIG. 5(d))

That is, the upper and lower input data are respectively written into the same address in different regions (upper bits 110H, lower bits 110L) of the dual port RAM 110 in the same time.

(data read operation)

As illustrated in FIG. 4(b), when the word length selection signal BUS 16/18 is in the H level, the LSB (A0) of the read address counter 130 is also fixed to the H level. (Note that the structure of the read address counter 130 is the same as the write address counter 120.) Accordingly, the second selector 160 selects the terminal A and thus the data read out from the lower bits 110L is transferred to the lower bits of data bus through the selector 160. On the other hand, the data read out from the upper bits 110H is directly transferred to the upper bits of data bus.

Turning now to FIG. 4(b), since the read address counter 130 sequentially outputs the address signal which is comprised of A1 through A4, the stored data are sequentially read out from the addresses designated by these address signals. The reading data scheme is illustrated in FIG. 6.

FIG. 6 is a table explaining the data reading scheme in the case where the input data word length ranges from 9 to 16 bits.

First, when the read address counter 130 outputs the address "0000" (the numeral which is put in the parenthesis is a numeral expressed by the decimal system) in response to the data read signal RD, the stored lower bits AL are read out from the address "0000" in the lower bits 110L and the stored upper bits AH are read out from the address "0000" in the upper bits 110H in the same time. (Refer to FIG. 6(a) and FIG. 6(b))

Next, the read address counter 130 outputs the address "0001" in response to the data read signal RD. Since the read address counter 130 outputs the "0001", the stored lower bits BL are read out from the address "0001" in the lower bits 110L. The stored upper bits BH are also read out from the address "0001" in the upper bits 110H in the same time. (Refer to FIG. 6 (c))

Thereafter, the stored data CL, CH, DL and DH are read out from the dual port RAM 110 in the same manner. (Refer to FIG. 6(d))

That is, the upper and lower stored data are respectively read out from the dual port RAM 110 in the same time.

(case 2: input data word length ranging from 1 to 8 bits)

(data write operation)

In the case where the input data has a word length ranging from 1 to 8 bits, the level of the word length selection signal BUS 16/8 is fixed to the L level. When the word length selection signal BUS 16/8 is in the L level, the selector 150 selects the terminal B. Therefore, the input lower bits INL on the lower bits of data bus are transferred to the upper bits 110H through the first selector 150. Also the input lower bits INL on the lower bits of data bus are directly transferred to the lower bits 110L. That is, the input data are alternately written into the lower bits 110L and the upper bits 110H.

As illustrated in FIG. 4(a), when the word length selection signal BUS 16/8 is in the L level, the write address counter 120 outputs A0 (LSB) which is toggled between the L level and the H level (alternately changed to the L level and the H level) according to the data write signal WR. The ORAND 1 and the ORAND 2 are alternately enabled by the toggled LSB.

Accordingly, the data write signal WR is alternately transferred to the upper bits 110H and the lower bits 110L. As a result, the upper bits 110H and the lower bits 110L are alternately available to write.

That is, if the LSB of the write address counter 120 is in the H level, the data write signal WR is transferred to the upper bits 110H of the dual port RAM 110 through the ORAND 1. Therefore, the input data on the lower bits of data bus are written into the upper bits 110H. If the LSB of the write address counter 120 is in the L level, the data write signal WR is transferred to the lower bits 110L of the dual port RAM 110 through the ORAND 2. Accordingly, the input data on the lower bits of data bus are written into the lower bits 110L.

The writing data scheme is illustrated in FIG. 7.

FIG. 7 is a table explaining the data writing scheme in the case where the input data word length ranges from 1 to 8 bits.

First, the write address counter 120 outputs the address "0000" (the numeral which is put in the parenthesis is a numeral expressed by the decimal system) according to the data write signal WR (the first pulsed signal WR).

At this time, since both the LSB of the write address counter 120 and the data word length selection signal BUS 16/8 are in the L level, the ORAND 2 is enabled. Therefore, the data write signal WR is transferred to the lower bits 110L through the ORAND 2. As a result, the input data A on the lower bits of the data bus are written into the address "0000" in the lower bits 110L. (Refer to FIG. 7(a))

Next, the write address counter 120 outputs the address "0000" in response to the data write signal WR (the second pulsed signal WR).

At this time, the LSB of the write address counter 120 is in the H level and the data word length selection signal BUS 16/8 is in the L level, the ORAND 1 is enabled. Therefore, the data write signal WR is transferred to the upper bits 110H through the ORAND 1. As a result, the input data B on the lower bits of the data bus are written into the address "0000" in the upper bits 110H. (Refer to FIG. 7(b))

Thereafter, the input data C and D which sequentially appear on the lower bits of the data bus are written into the dual port RAM 110 in the same manner. (Refer to FIG. 7(c) and FIG. 7(d))

(data read operation)

As illustrated in FIG. 4(a), when the word length selection signal BUS 16/8 is in the L level, the LSB (A0) of the read address counter 130 is toggled between the L level and the H level. (Note that the structure of the read address counter 130 is the same as the write address counter 120.)

Accordingly the second selector 160 alternately selects the terminal A and the terminal B. Thus, the data read out from the lower bits 110L and the data read out from the upper bits 110H are transferred to the lower bits of the data bus through the selector 160. (Actually, the data read out from the upper bits 110H is also transferred to the upper bits of the data bus. However, the transferred data is not used in this operation.)

Turning now to FIG. 4(a), since the read address counter 130 sequentially outputs the address signal which is comprised of A1 through A4, the stored data are sequentially read out from the addresses designated by these address signals. The reading data scheme is illustrated in FIG. 8.

FIG. 8 is a table explaining the data reading scheme in the case where the input data word length ranges from 1 to 8 bits.

In this case, the data A, B, C, and D have already been stored in the dual pot RAM 110 as illustrated in FIG. 8(a).

First, when the read address counter 130 outputs the address "0000" (the numeral which is put in the parenthesis is a numeral expressed by the decimal system) in response to the data read signal RD (the first pulsed signal RD), the stored data A and B which are stored in the address "0000" are respectively output from the output ports 110OH and 110OL. However, since the data ranging from 1 to 8 bits is handled in this operation, the data B output from the output port 110OH is not used. That is, only the stored data A which is output from the output port 110OL is transferred to the lower bits of the data bus through the second selector 160 and is only used as read out data. (Refer to FIG. 8(b)) Note that, since the stored data B is not used as read out data at this time, the stored data B is still shown in FIG. 8(b). On the other hand, since the stored data A has been used as read out data, the stored data A is not shown in FIG. 8(b).

Next, the read address counter 130 outputs the address "0000" in response to the data read signal RD (the second pulsed signal RD). Since the read address counter 130 outputs the "0000", the stored data A and B which are stored in the address "0000" are respectively output from the output port 110OL and 110OH. However, since the LSB of the read address counter 130 is changed to the H level, the second selector 160 selects the terminal B. Accordingly, only the stored data B which is output from the output port 110OH is transferred to the lower bits of the data bus through the second selector 160. That is, the stored data B is substantially read out from the address "0000" in the upper bits 110H. (Refer to FIG. 8(c))

Thereafter, if the data write signal WR is applied to the FIFO memory 100 instead of the data read signal RD, the write address counter 120 outputs "0010"

At this time, since both the LSB of the write address counter 120 and the data word length selection signal BUS 16/8 are in the L level, the ORAND 2 is enabled. Therefore, the data write signal WR is transferred to the lower bits 110L through the ORAND 2 and then the input data E on the lower bits of the data bus are written into the address "0010" in the lower bits 110L. (Refer to FIG. 8(d))

Since the word length selection signal BUS 16/8 is provided in this embodiment, the present invention has an effect as follows.

In the case where the length of the input data word (for example, 8 bits) is not more than ½ of an acceptable data length (for example, 16 bits), it can stores the data two times as long as the conventional FIFO memory. Therefore, it is possible to decrease the access frequency to an external circuit.

Second Embodiment

A FIFO memory according to the second preferred embodiment will be explained hereinafter with reference to the figures.

Figure 9:
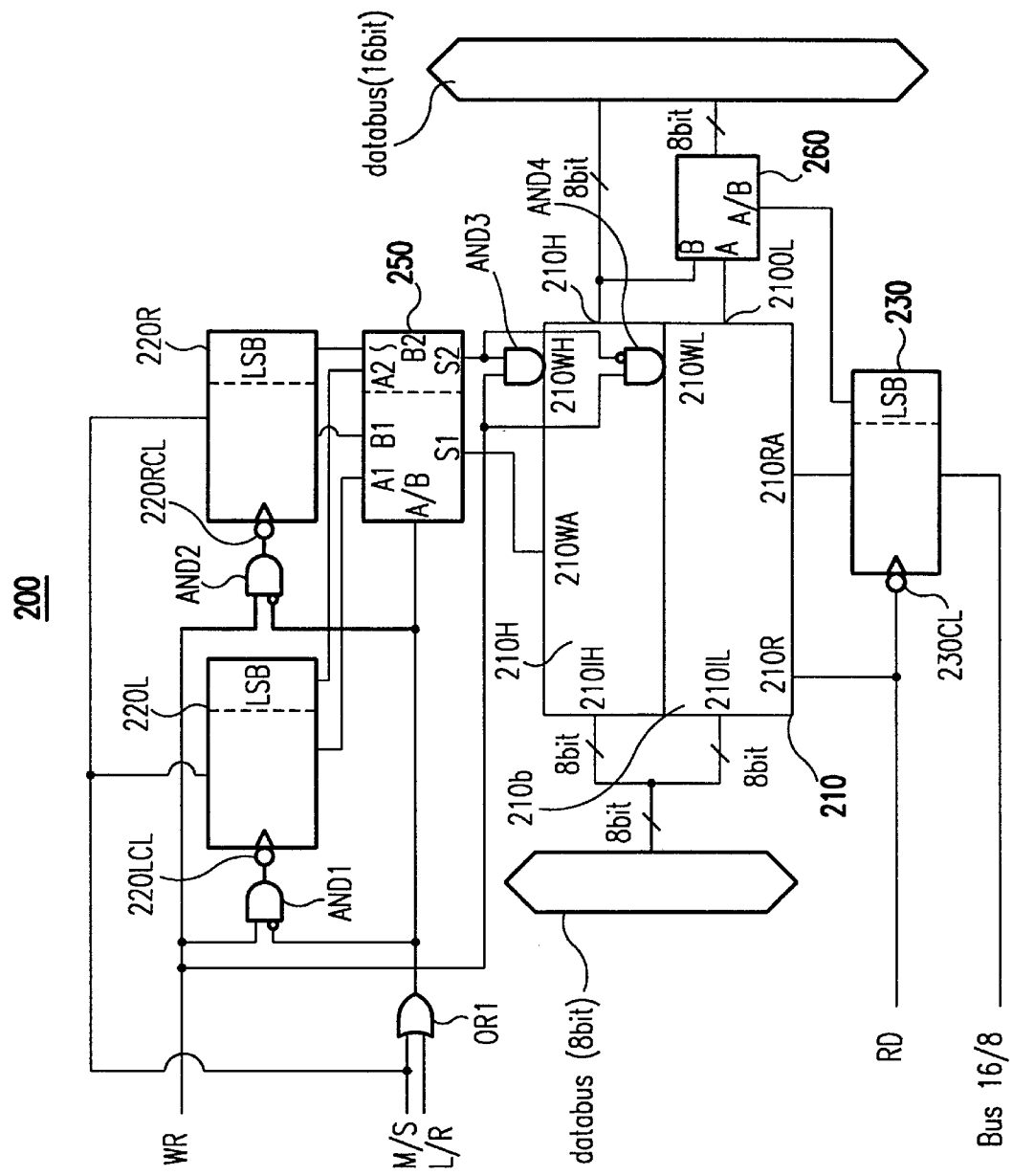
FIG. 9 is a block diagram showing a FIFO memory 200 according to the second preferred embodiment of the present invention.

FIG. 9 is a block diagram showing a FIFO memory 200 according to the second preferred embodiment of the present invention.

Main features of the FIFO memory 200 are as follows.

First, selection signals M/S and L/R are provided in the FIFO memory 200. The selection signals M/S and L/R changes the way to write data and to read data according to whether an input data comprises one channel (MONO) or two channels (STEREO).

Second, memory regions of a dual port RAM 210 are separated into a region for a left channel and a region for a right channel. The FIFO memory 200 whereby can handle a data interface dealing with multiple channel (for example, two channels).

In the preferred embodiment, the FIFO memory 200 handles two channels input data at most, however, the present invention is not limited to such this structure.

The FIFO memory 200 is mainly made up of the dual port RAM 210, a left channel write address counter 220L, a right channel write address counter 220R, a read address counter 230, a selector 250, a selector 260, an OR 1, AND 1, AND 2 AND 3 and AND 4.

The selector 250 selects an output signal output from either one of the left channel write address counter 220L or the right channel write address counter 220R. The OR 1 changes the way of controlling data according to the channel number (one or two) that the input data has. The AND 1 selectively transfers a data write signal WR to the left channel write address counter 220L according to an output signal of the OR 1. The AND 2 selectively transfers the data write signal WR to the right channel write address counter 220R according to the output signal of the OR 1. The AND 3 transfers the data write signal WR to an upper bits 210H of the dual port RAM 210. The AND 4 transfers the data write signal WR to a lower bits 210L of the dual port RAM 210.

The OR 1 receives the selection signals M/S and the selection signal L/R which is a signal that the input signal indicates the left channel or the right channel. When the input data is one channel, the selection signal M/S goes to the H level and thus the output of the OR 1 is fixed to the H level. On the other hand, when the input data is two channels, the selection signal M/S goes to the L level. Thus the output of the OR 1 is identical to the level of the selection signal L/R. An operation difference depending upon the level of the output signal of the OR 1 will be explained later.

The dual port RAM 210 includes the upper bits 210H, the lower bits 210L, an upper bits write terminal 210WH for receiving the data write signal WR and outputting the received signal to the upper bits 210H, a lower bits write terminal 210WL for receiving the data write signal WR and outputting the received signal to the lower bits 210L, and a write address terminal 210WA for receiving a write address signal.

The dual port RAM 210 also includes an upper bits data input port 210IH for receiving input data and transferring the received input data to the upper bits 210H, a lower bits data input port 210IL for receiving input data and transferring the received input data to the lower bits 210L.

The dual port RAM 210 further includes an upper bits data output port 210OH for outputting the data stored in the upper bits 210H, a lower bits data output port 210OL for outputting the data stored in the lower bits 210L, a data read terminal 210R for receiving data read signal RD, and a read address terminal 210RA for receiving a lead address signal.

The AND 1 receives the output signal of the OR 1 and the data write signal WR and outputs a signal to a clock input terminal 220LCL of the left channel write address counter 220L. Therefore, when writing the input data which is comprised of one channel and writing the left channel of the input data which is comprised of two channels, the OR 1 outputs the H level and whereby the left channel write address counter 220L operates. An output signal of the left channel address counter 220L is output to the selector 250.

The AND 2 receives the inverted output signal of the OR 1 and the data write signal WR and outputs a signal to a clock input terminal 220RCL of the right channel write address counter 220R. Therefore, only when writing the right channel of the input data which is comprised of two channels, the right channel write address counter 220R operates. An output signal of the right channel write address counter 220R is output to the selector 250.

The selector 250 has a terminal A1, B1 which receive the write address signals output from the left channel write address counter 220L and the right channel address counter 220R, and a terminal A2, B2 which receive the least significant bits output from the left channel write address counter 220L and the right channel address counter 220R.

The selector 250 is controlled by the output signal of the OR 1 and selects either the left write address signal and the LSB or the right write address signal and the LSB. That is, when the OR 1 outputs the H level, it selects the left write address signal and the LSB and outputs the selected write address signal to the write address terminal 210WA from a terminal S1. It also selects the LSB of the left channel write address counter 220L and outputs the selected LSB to the AND 3 and the AND 4 from a terminal S2.

When the OR 1 outputs the L level, it selects the right write address signal and the LSB and outputs the selected write address signal to the write address terminal 210WA from the terminal S1. It also selects the LSB of the right channel write address counter 220L and outputs the selected LSB to the AND 3 and the AND 4 from the terminal S2.

Figure 10:
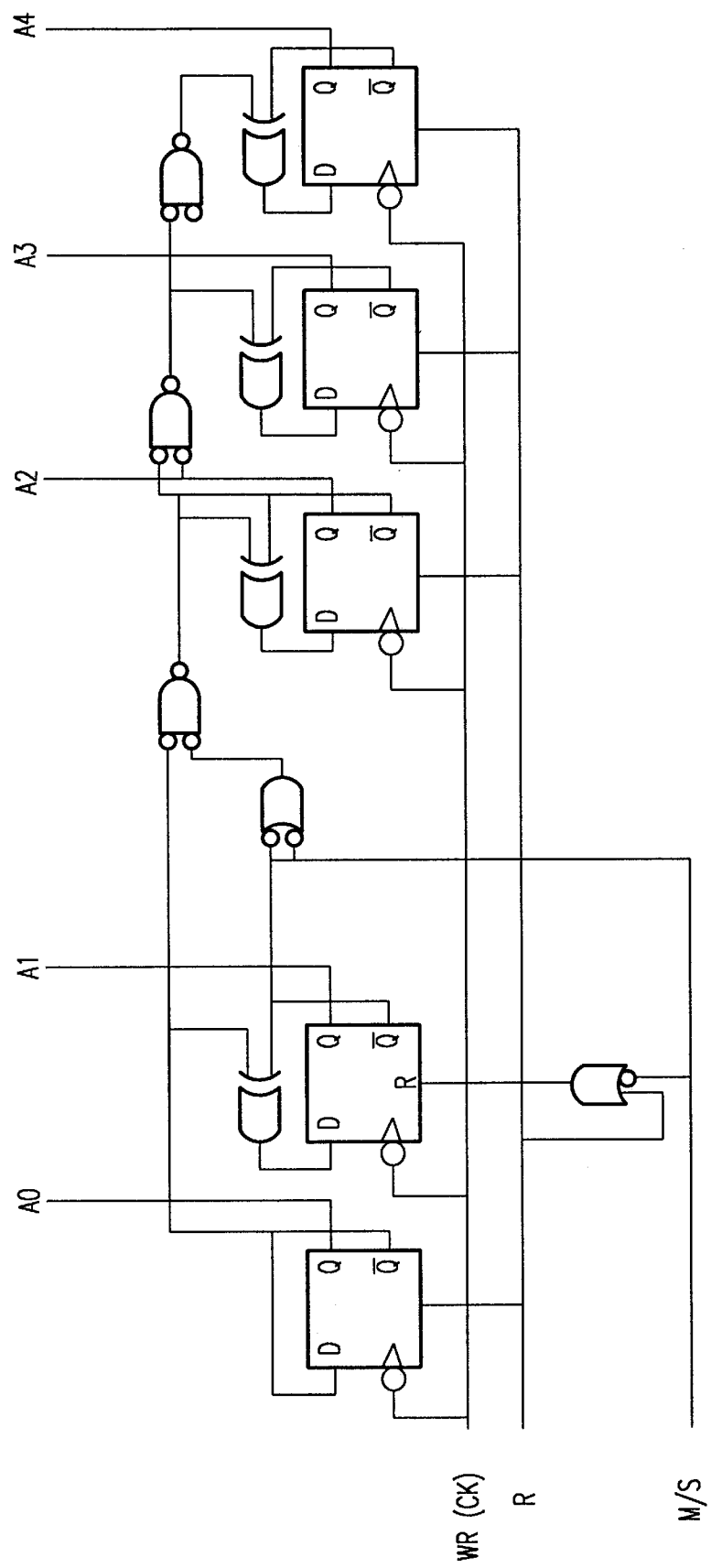
FIG. 10 is a detailed circuit diagram showing the left channel write address counter 220L.

FIG. 10 is a detailed circuit diagram showing the left channel write address counter 220L.

The left channel write address counter 220L is comprised of a plurality of flip flops and logic gates. The left channel write address counter 220L outputs the write address signal as shown in FIG. 11 and FIG. 12 in response to the data write WR signal while a reset signal is in the L level.

Figure 11A:
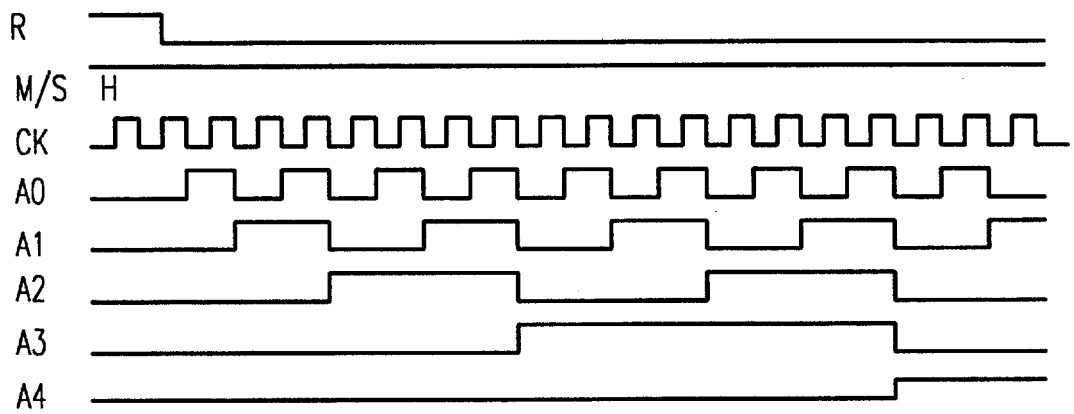
FIG. 11(a) and FIG. 11(b) are timing charts showing the output signal of the left channel write address counter 220L.
Figure 11B:
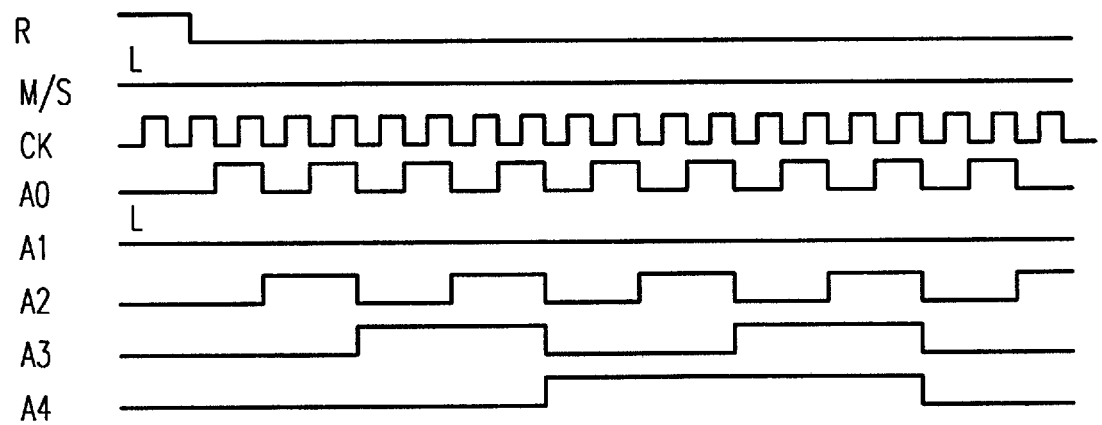

FIG. 11(*a*) and FIG. 11(*b*) are timing charts showing the output signal of the left channel write address counter 220L. FIG. 11(*a*) shows the case where the selection signal M/S is in the H level. In this case, the input data is comprised of one channel (MONO). On the other hand, FIG. 11(*b*) shows the case where the selection signal M/S is in the L level. In this case, the input data is comprised of two channels (STEREO).

FIG. 12(*a*) and FIG. 12(*b*) are truth tables of the output signal of the left channel write address counter 220L. FIG. 12(*a*) corresponds to the timing chart of FIG. 11(*a*). FIG. 12(*b*) corresponds to the timing chart of FIG. 11(*b*).

Figure 13:
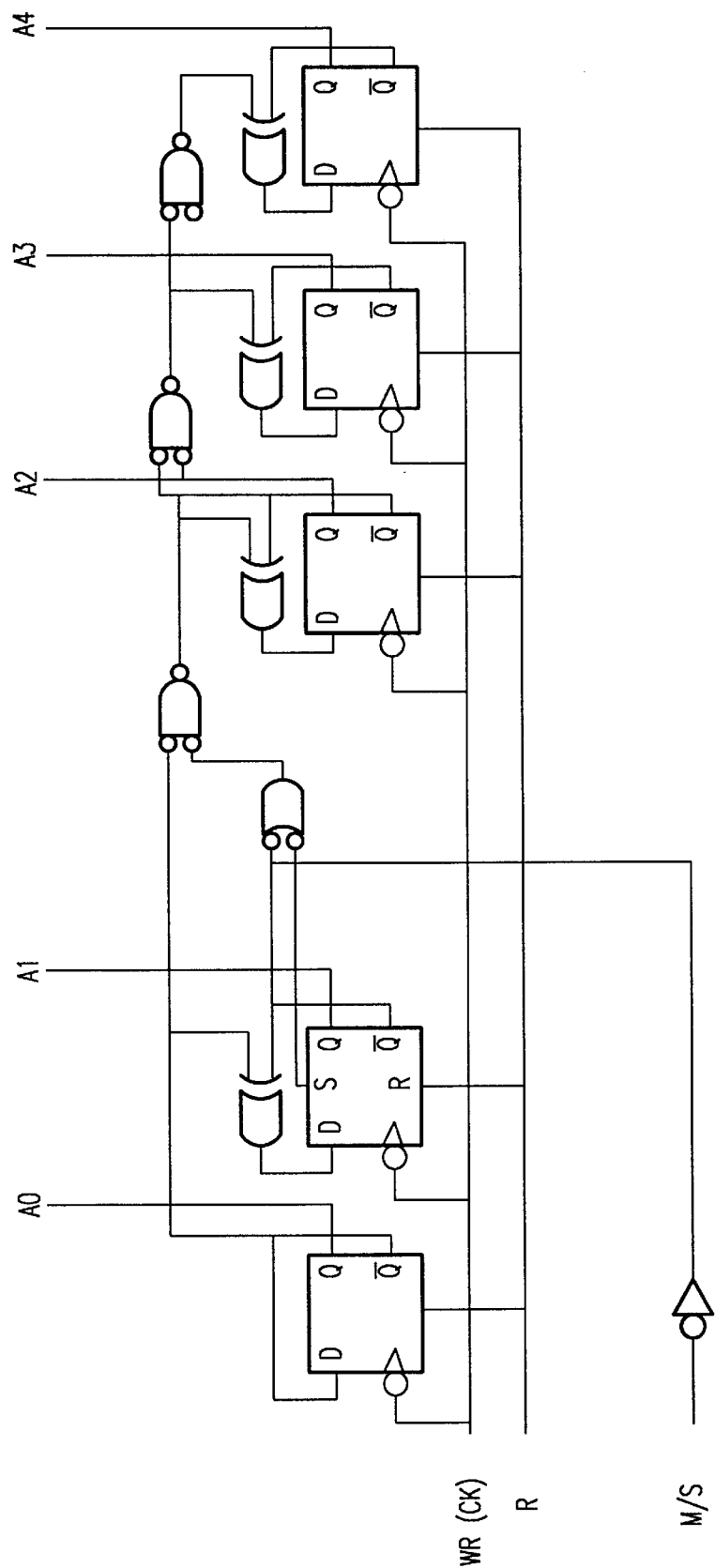
FIG. 13 is a detailed circuit diagram showing the light channel write address counter 220R.

On the other hand, FIG. 13 is a detailed circuit diagram showing the right channel write address counter 220R.

Figure 14A:
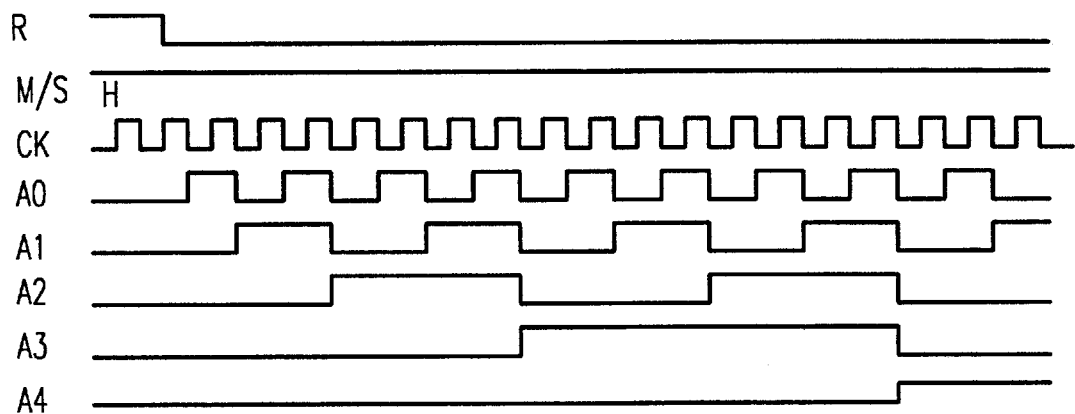
FIG. 14(a) and FIG. 14(b) are timing charts showing the output signal of the right channel write address counter 220R.

The right channel write address counter 220R is also comprised of a plurality of flip flops and logic gates. The right channel write address counter 220R outputs the write address signal as shown in FIG. 14 and FIG. 15 in response to the data write WR signal while a reset signal is in the L level.

Figure 14B:
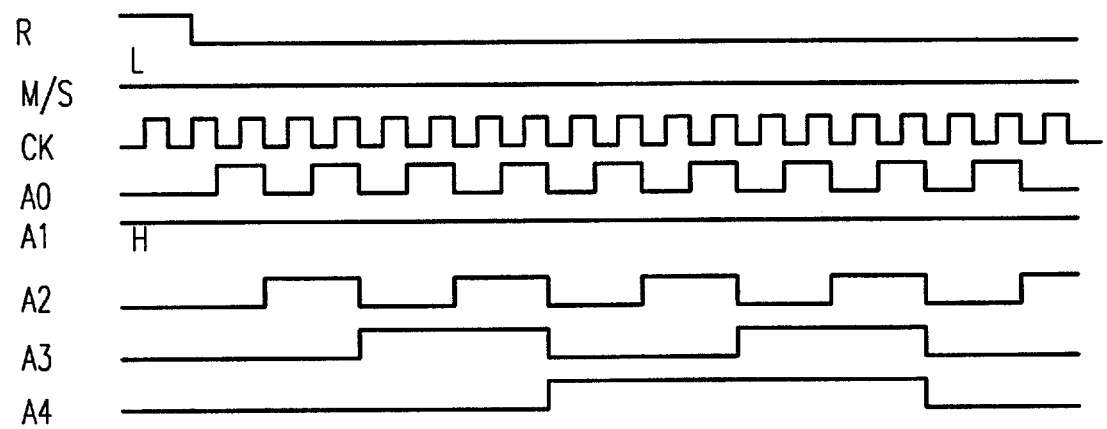

FIG. 14(*a*) and FIG. 14(*b*) are timing charts showing the output signal of the right channel write address counter 220R. FIG. 14(*a*) shows the case where the selection signal M/S is in the H level. In this case, the input data is comprised of one channel (MONO). On the other hand, FIG. 14(b) shows the case where the selection signal M/S is in the L level. In this case, the input data is comprised of two channels (STEREO).

FIG. 15(a) and FIG. 15(b) are truth tables of the output signal of the right channel write address counter 220R. FIG. 15(a) corresponds to the timing chart of FIG. 14(a). FIG. 15(b) corresponds to the timing chart of FIG. 14(b).

The detailed circuit diagram of the read address counter 230 is not shown, because it has the same structure as the read address counter 130. Therefore, the output signals of the read address counter 230 are also the same as those of the read address counter 130.

The operations of the selector 260 and the read address counter 230 according to the word length selection signal BUS 16/8 are the same as those of the first preferred embodiment. In this preferred embodiment, the output data which is transferred to the data bus is explained as 8 bits. Thus the level of the word length selection signal BUS 16/8 is maintained at the L level during output operation.

Next, an operation of the FIFO memory 200 of the second preferred embodiment will be explained hereinafter with reference to FIG. 9, FIG. 10 through FIG. 15.

(case 1: input data is one channel (MONO))

(data write operation)

In the case where the input data indicates one channel, the selection signal M/S is set to the H level. When the selection signal M/S is in the H level, the OR 1 outputs the H level. Accordingly, the selector 250 selects the terminals A1 and A2.

Since the OR 1 outputs the H level, the AND 1 outputs the H level to the left channel write address counter 220L when the H level of the data write signal is applied thereto. That is, the AND 1 is enabled to transfer the data write signal WR to the left channel write address counter 220L. On the other hand, the AND 2 outputs the L level to the right channel write counter 220R regardless of the data write signal WR. That is, the AND 2 is disabled to transfer the data write signal WR to the right channel write address counter 220R.

As a result, only the write addresses which are counted by the left channel write address counter 220L are transferred to the write address terminal 210WA through the selector 250.

As illustrated in FIG. 12(a), when the selection signal M/S is in the H level, the left channel write address counter 220L outputs A0 (LSB) which is toggled between the L level and the H level according to the data write signal WR. The AND 3 and the AND 4 are alternately enabled by the toggled LSB. Accordingly, the data write signal WR is alternately transferred to the upper bits 210H and the lower bits 210L. As a result, the upper bits 210H and the lower bits 210L are alternately available to write.

That is, if LSB of the left channel write address counter 220L is in the H level, the data write signal WR is transferred to the upper bits 210H of the dual port RAM 210 through the AND 3. Therefore, the input data on the data bus is written into the upper bits 210H. If LSB of the left channel write address counter 220L is in the L level, the data write signal WR is transferred to the lower bits 210L of the dual port RAM 210 through the AND 4. Therefore, the input data on the data bus is written into the lower bits 210L.

The left channel write address counter 220L also sequentially outputs the address signal which is comprised of A1 through A4 (that is, "equivalent address" indicates these A1 through A4). Therefore, the input data are sequentially written into addresses designated by these signals in response to the data write signal WR. The writing data scheme is illustrated in FIG. 16.

FIG. 16 is a table explaining the data writing scheme in the case where the input data is one channel.

First, the left channel write address counter 220L outputs the address "0000" and the LSB "0" in response to the data write signal WR (output signal of the AND 1). At this time, since the LSB of the left write address counter 220L is in the L level, the AND 4 is enabled. Thus the data write signal WR is transferred to the lower bits 210L through the AND 4. Therefore, an input data A is written into the address "0000" in the lower bits 210L of the dual port RAM 210. (Refer to FIG. 16(a))

Next, the left channel write address counter 220L outputs the address "0000" and the LSB "1" in response to the data write signal WR. At this time, since the LSB of the left write address counter 220L is in the H level, the AND 3 is enabled instead of the AND 4. Therefore, the data write signal WR is transferred to the upper bits 210H through the AND 3. As a result, an input data B is written into the address "0000" in the upper bits 210H of the dual port RAM 210. (Refer to FIG. 16(b))

Thereafter, input data C and D are written into the dual port RAM 210 in the same manner. (Refer to FIG. 16(c) and FIG. 16(d))

(data read operation)

As illustrated in FIG. 4(a), when the word length selection signal BUS 16/8 is in the L level, the LSB (A0) of the read address counter 230 is toggled between the L level and the H level.

Accordingly the second selector 260 alternately selects the terminal A and the terminal B. Thus, the data read out from the lower bits 210L and the data read out from the upper bits 210H are transferred to the lower bits of the data bus through the selector 260. (Actually, the data read out from the upper bits 210H is also transferred to the upper bits of the data bus. However, the transferred data is not used in this operation.)

Since the read address counter also sequentially outputs the address signal which is comprised of A1 through A4 and the LSB, the stored data are sequentially read out from the addresses designated by these addresses. Reading data scheme is illustrated in FIG. 17.

FIG. 17 is a table explaining the data reading scheme in the case where the input data is comprised of one channel type.

First, when the read address counter 230 outputs the address "0000" and the LSB "0" in response to the data read signal RD, the data A and the data B which are stored in the address "0000" are respectively output from the output ports 210OH and 210OL. However, since the data ranging from 1 to 8 bits is handled in this operation, the data B output from the output port 110OH is not used. That is, only the stored data A which is output from the output port 110OL is transferred to the lower bits of the data bus through the selector 260 and is only used as read out data. (Refer to FIG. 17(a) and FIG. 17(b)) Note that, since the stored data B is not used as read out data at this time, the stored data B is still shown in FIG. 17(b). On the other hand, since the stored data A has been used as read out data, the stored data A is not shown in FIG. 17(b).

Next, since the read address counter 230 outputs the address "0000" and the LSB "1" in response to the data read signal RD, the stored data A and B which are stored in the address "0000" are respectively output from the output port 210OL and 210OH. However, since the LSB of the read address counter 230 is changed to the H level, the selector 260 selects the terminal B. Accordingly, only the stored data B which is output from the output port 210OH is transferred to the lower bits of the data bus through the selector 260. That is, the stored data B is substantially read out from the address "0000" in the upper bits 210H. Refer to FIG. 17(c))

Thereafter, the stored data C is read out from the dual port RAM 210 in the same manner. (Refer to FIG. 17(d))

(case2: input data is two channel (STEREO))

(data write operation)

In the case where the input data indicates two channels, the selection signal M/S is set to the L level. Furthermore, if the input data is a data which is used for a left channel, the selection signal L/R is set to the H level. If the input data is a data which is used for a right channel, the selection signal L/R is set to the L level.

Therefore, the voltage level of the output of the OR 1 depends on the selection signal L/R. As a result, when the selection signal L/R is in the H level (the input data indicates the left channel), the left channel write address counter 220L outputs the write address signal and the LSB to the selector 250 and then the selector 250 transfers them to the dual port RAM 210. When the selection signal L/R is in the L level (the input data indicates the right channel), the right channel write address counter 220R outputs the write address signal and the LSB to the selector 250 and then the selector 250 transfers them to the dual port RAM 210.

When the selection signal M/S is in the L level, the left channel write address counter 220L outputs the address signals of even number as illustrated in FIG. 12(b). Therefore, the input data, perhaps it is the left channel data, are written into even number addresses.

When the selection signal M/S is in the L level, the right channel write address counter 220R outputs the address signals of odd number as illustrated in FIG. 15(b). Therefore, the input data, perhaps it is the right channel data, are written into odd number addresses.

The writing data scheme is illustrated in FIG. 18.

FIG. 18 is a table explaining the data writing scheme in the case where the input data is two channels type.

First, when the selection signal L/R is in the H level, the left channel write address counter 220L outputs the address "0000" and the LSB "0" in response to the data write signal WR (output signal of the AND 1). At this time, since the LSB of the left write address counter 220L is in the L level, the AND 4 is enabled. Thus the data write signal WR is transferred to the lower bits 210L through the AND 4. Therefore, an input data L1 which is the left channel data is written into the address "0000" in the lower bits of the dual port RAM 210. (Refer to FIG. 18(a))

Next, the left channel write address counter 220L outputs the address "0000" and the LSB "1" in response to the data write signal WR. At this time, since the LSB of the left write address counter 220L is in the H level, the AND 3 is enabled instead of the AND 4. Therefore, the data write signal WR is transferred to the upper bits 210H through the AND 3. As a result, an input data L2 which is the left channel data is written into the address "0000" in the upper bits of the dual port RAM 210. (Refer to FIG. 18(b))

Then, the left channel write address counter 220L outputs the address "0010" and the LSB "0" in response to the data write signal WR. An input data L3 which is the left channel data is written into the address "0010" in the lower bits of the dual port RAM 210. (Refer to FIG. 18(c))

Next, the left channel write address counter 220L outputs the address "0010" and the LSB "1" in response to the data write signal WR. Since the left channel write address counter 220L outputs the LSB "1", an input data L4 which is the left channel data is written into the address "0010" in the upper bits of the dual port RAM 210. (Refer to FIG. 18(d))

Thereafter, the selection signal L/R is changed to the L level in order to receive the right channel data. When the selection signal L/R is in the L level, the right channel write address counter 220R outputs the address "0001" and the LSB "0" in response to the data write signal WR (output signal of the AND 2). An input data R1 which is the right channel data is written into the address "0001" in the lower bits of the dual port RAM 210. (Refer to FIG. 18(e))

Then, the right channel write address counter 220R outputs the address "0010" and the LSB "1" in response to the data write signal WR. Since the right channel write address counter 220R outputs the LSB "1", an input data R2 which is the right channel data is written into the address "0010" in the upper bits of the dual port RAM 210. (Refer to FIG. 18(f))

(data read operation)

As illustrated in FIG. 4(a), when the word length selection signal BUS 16/8 is in the L level, the LSB (A0) of the read address counter 230 is toggled between the L level and the H level.

Accordingly the second selector 260 alternately selects the terminal A and the terminal B. Thus, the data read out from the lower bits 210L and the data read out from the upper bits 210H are transferred to the lower bits of the data bus through the selector 260. (Actually, the data read out from the upper bits 210H is also transferred to the upper bits of the data bus. However, the transferred data is not used in this operation.)

Since the read address counter also sequentially outputs the address signal which is comprised of A1 through A4 and the LSB, the stored data are sequentially read out from the addresses designated by these addresses. The reading data scheme is illustrated in FIG. 19.

FIG. 19 is a table explaining the data reading scheme in the case where the input data is comprised of two channels type.

In this case, the left channel data L1 through L4, the right channel data R1, and R2 have already been stored in the dual port RAM 110 as illustrated in FIG. 19(a).

First, when the read address counter 230 outputs the address "0000" and the LSB "0" in response to the data read signal RD, the data L1 and the data L2 are respectively output from the output ports 210OH and 210OL. However, since the data ranging from 1 to 8 bits is handled in this operation, the data L2 output from the output port 110OH is not used. That is, only the stored data L1 which is output from the output port 110OL is transferred to the lower bits of the data bus through the selector 260 and is only used as read out data. (Refer to FIG. 19(a) and FIG. 19(b))

Next, since the read address counter 230 outputs the address "0000" and the LSB "1" in response to the data read signal RD, the data L1 and L2 are respectively output from the output port 210OL and 210OH. However, since the LSB of the read address counter 230 is changed to the H level, the selector 260 selects the terminal B. Accordingly, only the stored data L2 which is output from the output port 210OH is transferred to the lower bits of the data bus through the selector 260. That is, the stored data L2 is substantially read out from the address "0000" in the upper bits 210H. (Refer to FIG. 19(c))

Then, since the read address counter 230 outputs the address "0001" and the LSB "0", the data R1 is read out from the address "0001" in the lower bits. (Refer to FIG. 19(d))

Next, since the read address counter 230 outputs the address "0001" and the LSB "1" in response to the data read signal RD, the data R2 is read out from the address "0001" in the upper bits. (Refer to FIG. 19(e))

At this time, if the selection signal L/R having the L level and the data write signal WR are applied to the FIFO memory 200, the right channel write address counter 220R outputs the address signal "0011" and the LSB "0". Therefore, the right channel data R3 is written into the address "0011" in the lower bits. (Refer to FIG. 19(f))

As explained above, since the FIFO memory 200 of this preferred embodiment may handle both the data interface of one channel type and the data interface of two channels type, it can meet the needs for diversified plural kinds of interfaces.

In this preferred embodiment, two channel type is explained as multiple channel type, however, the present invention is not limited to this feature. The present invention can be applied to three or more channels type.

Third Embodiment

A FIFO memory according to the third preferred embodiment will be explained hereinafter with reference to the FIG. 20.

Figure 20:
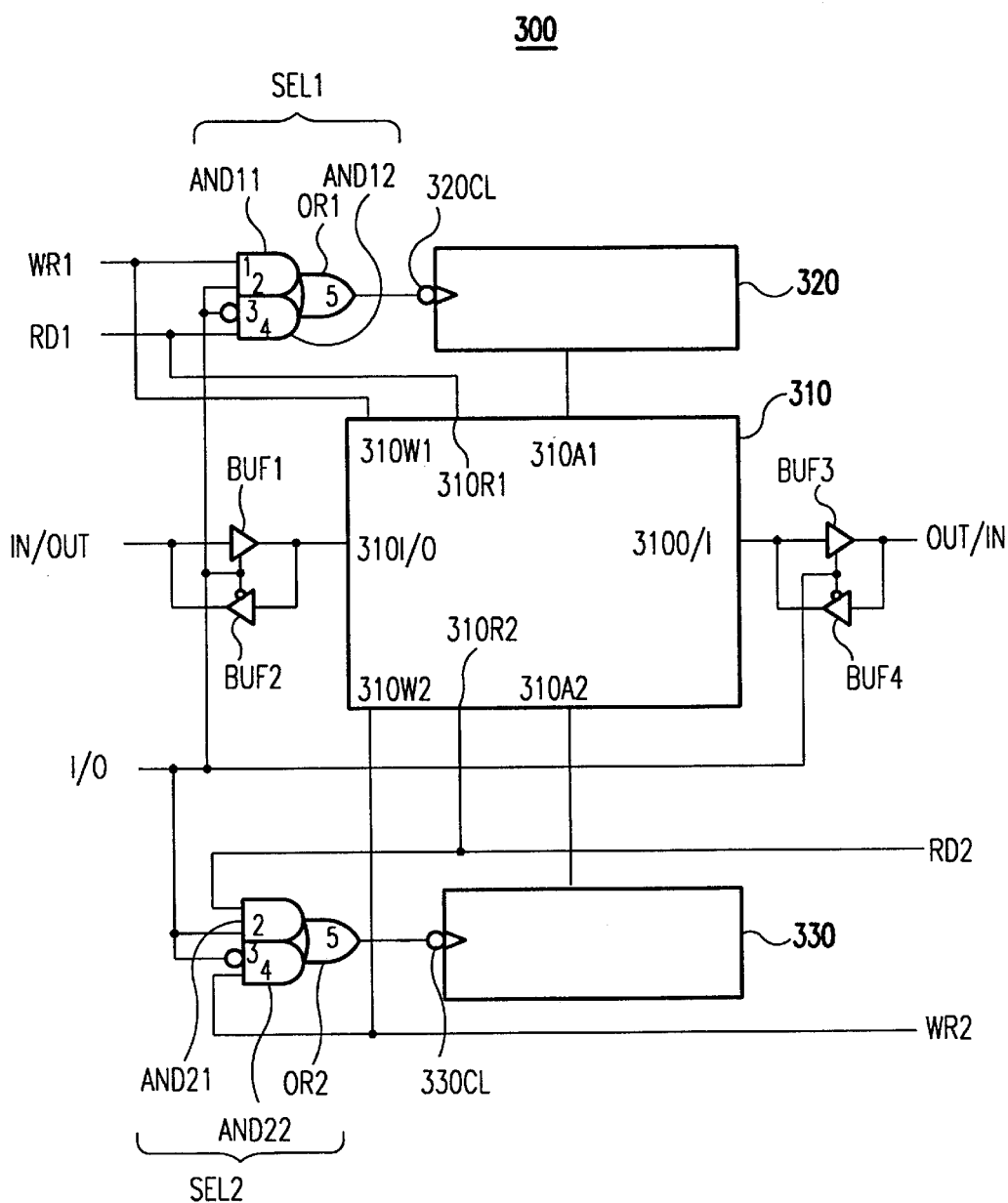
FIG. 20 is a block diagram showing a FIFO memory 300 according to the third preferred embodiment of the present invention.
Figure 21:
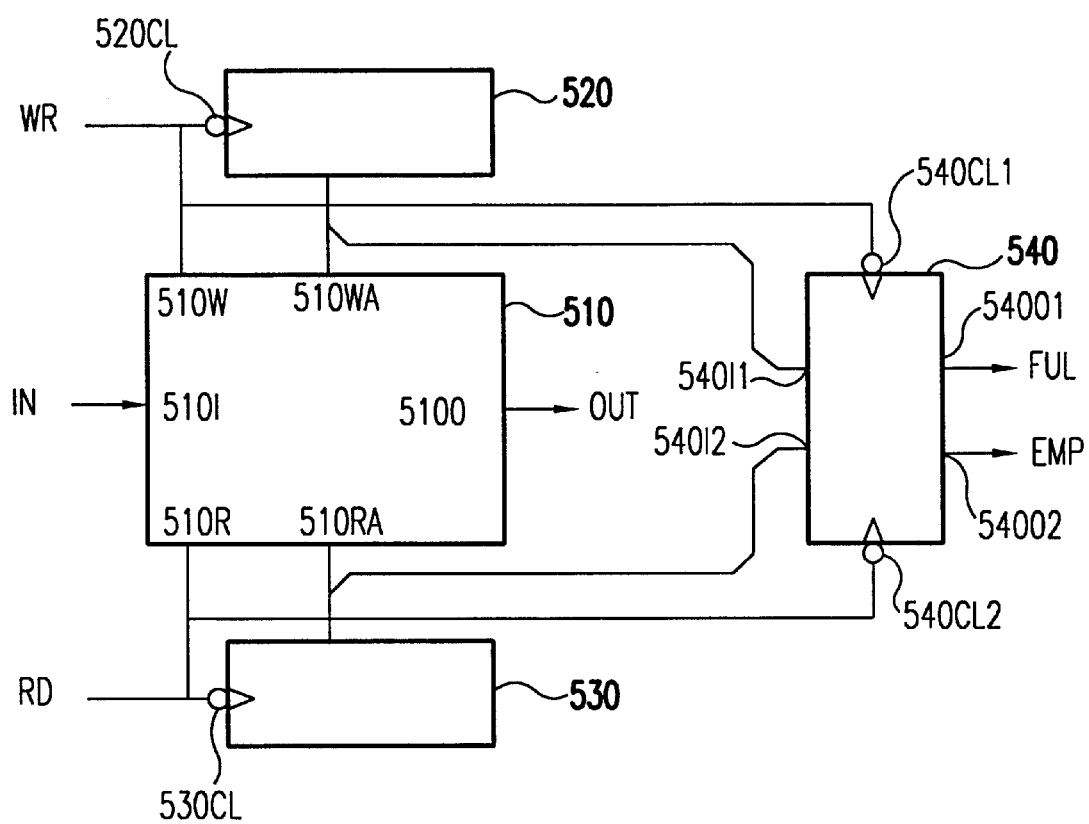
FIG. 21 is a block diagram showing a conventional FIFO memory.
Figure 22:
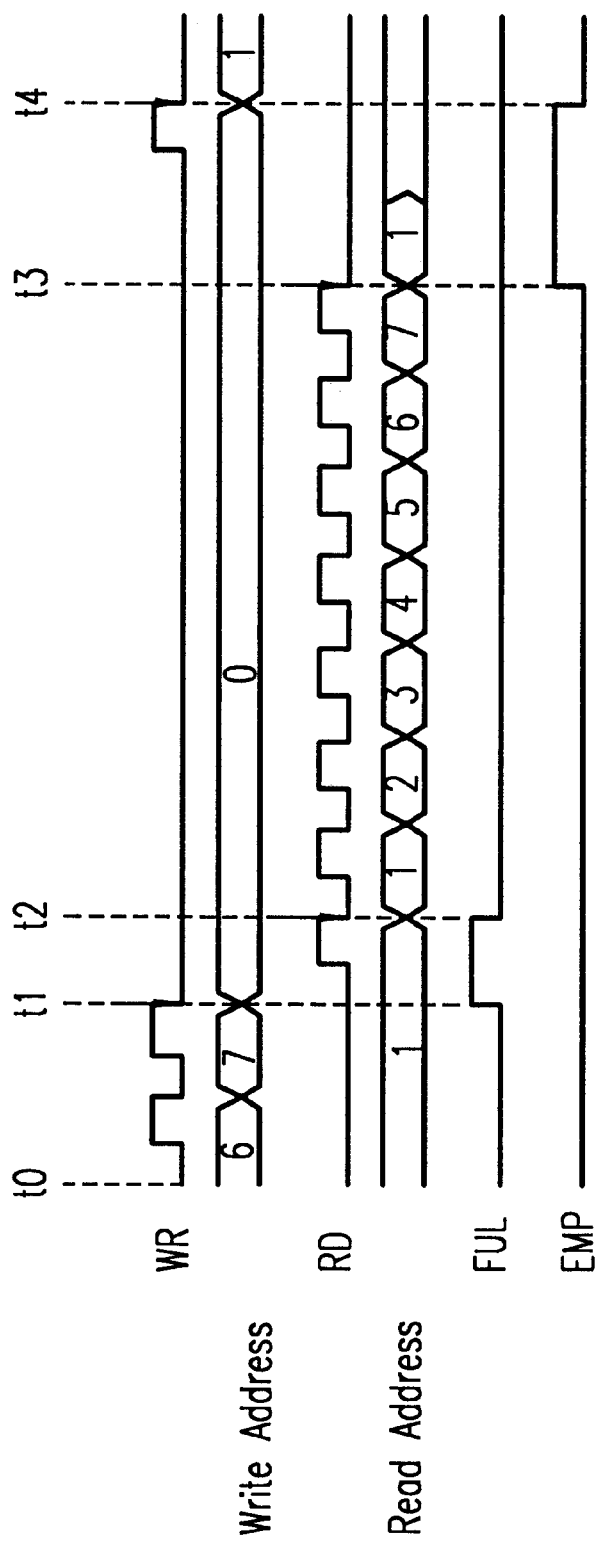
FIG. 22 is a timing chart showing an operation of a conventional FIFO memory.
Figure 23:
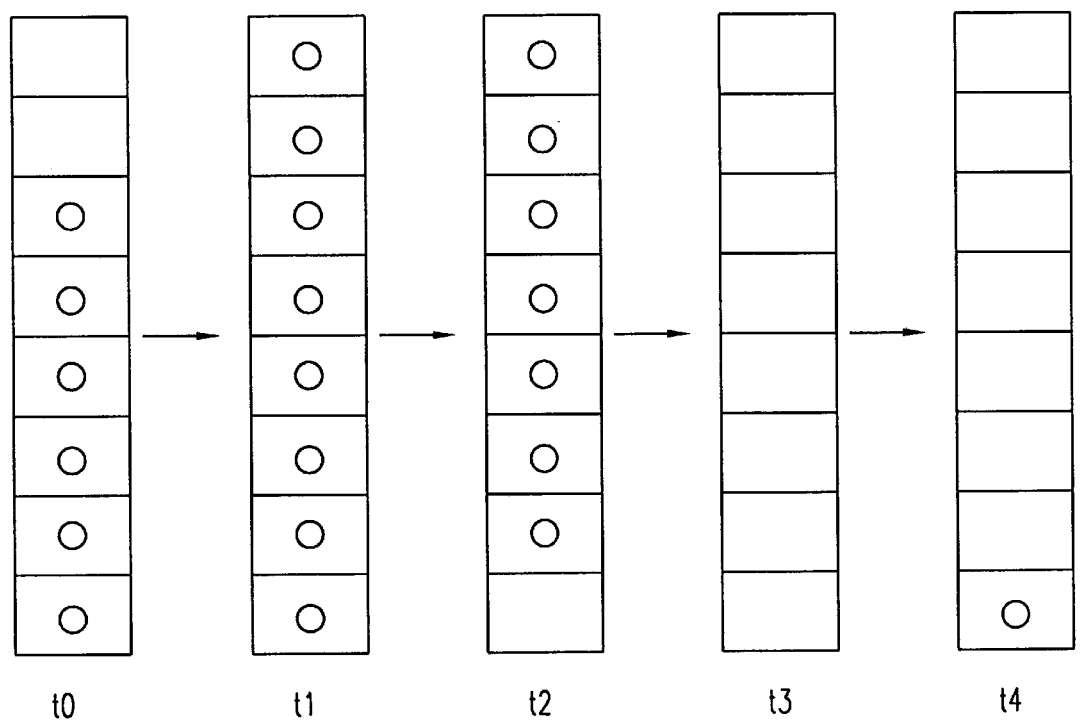
FIG. 23 is a table explaining the data reading and writing schemes of a conventional FIFO memory.

FIG. 20 is a block diagram showing a FIFO memory 300 according to the third preferred embodiment of the present invention.

One of features of the FIFO memory 300 is to add several circuits so that two ports of dual RAM respectively function as data input port and data output port. Furthermore, another feature is to provide a selection signal I/O which changes the function of the ports.

The FIFO memory 300 includes the dual port RAM 310, a first address counter 320 for data reading/data writing, a second address counter 330 for data writing/data reading, buffer BUF 1 and BUF 2 which control data input/data output between the dual port RAM 310 and an input/output data bus IN/OUT, and buffer BUF 3 and BUF 4 which control data input/data output between the dual port RAM 310 and an input/output data bus OUT/IN. The FIFO memory 300 further includes a first selector SEL 1 which changes the function of the first address counter 320 and second selector SEL 2 which changes the function of the second address counter 330.

The detailed circuit diagrams of the first address counter 320 and the second address counter 330 are not shown in this embodiment, because they are well known conventional address counters. Thus they output signals like those shown in FIG. 12(a).

The dual port RAM 310 has a first address terminal 310A1 which connected to the first address counter 320 and receives an address signal for data writing/data writing, a second address terminal 310A2 which connected to the second address counter 330 and receives an address signal for data reading/data writing, a first write terminal 310W1 which receives a data write signal WR1 when the first address counter 320 functions as a write address counter, and a first read terminal 310R1 which receives a data read signal RD1 when the first address counter 320 serves as a read address counter.

The dual port RAM 310 further has a second write terminal 310W2 which receives a data write signal WR2 when the second address counter 330 functions as the write address counter, a second read terminal 310R2 which receives a data read signal RD2 when the second address counter 330 serves as the read address counter, a first port 310I/O which inputs and outputs data, and a second port 310I/O which inputs and outputs data.

Either one of the data write signal WR1 or the data read signal RD1 is selected by the selector SEL 1 and transfers to a clock input terminal 320CL of the first address counter 320. The first address counter 320 operates as the write address counter when the data write signal WR1 is applied thereto. The first address counter 320 operates as the read address counter when the data read signal RD1 is applied thereto. The first address counter 320 outputs the address signal (write address signal or read address signal) to the first address terminal 310A1 of the dual port RAM 310.

Either one of the data write signal WR2 or the data read signal RD2 is selected by the selector SEL 2 and transfers to a clock input terminal 330CL of the second address counter 330. The second address counter 330 operates as the write address counter when the data write signal WR2 is applied thereto. The second address counter 330 operates as the read address counter when the data read signal RD2 is applied thereto. The second address counter 330 outputs the address signal (write address signal or read address signal) to the second address terminal 310A2 of the dual port RAM 310.

Next, a selection signal I/O and its function will be explained hereinafter.

The selection signal I/O is a signal which selects the port 310I/O and 310I/O so that either one of the port 310I/0 or the port 310O/I functions as a data input port and the others functions as a data output port. The selection signal I/O controls the buffers BUF1 BUF2 which are located between the input/output data bus IN/OUT and the first port 310I/O. The buffer BUF1 is enabled when a signal having the H level is applied thereto. The buffer BUF1 transfers the data inputted thereto to the first port 310I/O when it is enabled. The buffer BUF2 is enabled when a signal having the L level is applied thereto. The buffer BUF2 transfers the data inputted thereto to the input/output data bus IN/OUT when it is enabled.

The selection signal I/O also is a signal which selects the first address counter 320 and the second address counter 330 so that either one of the first address counter 320 or the second address counter 330 functions as the write address counter and the others functions as the read address counter. The selection signal I/O controls the first selector SEL 1 which receives the data write signal WR1 and the data read signal RD1.

An AND 11 is enabled when the selection signal I/O having the H level is inputted thereto. The AND 11 outputs the data write signal WR1 to the first address counter 320 through an OR1 when the selection signal I/O is in the H level. On the other hand, an AND 12 is enabled when the selection signal I/O having the L level is inputted thereto. The AND 12 outputs the data read signal RD1 to the fast address counter 320 through the OR1 when the selection signal I/O is in the L level.

The selection signal I/O further controls the second selector SEL2 which receives the data write signal WR2 and the data read signal RD2.

An AND21 is enabled when the selection signal I/O having the H level is inputted thereto. The AND 12 outputs the data read signal RD2 to the second address counter 330 through an OR2 when the selection signal I/O is in the H level. On the other hand, an AND22 is enabled when the selection signal I/O having the L level is inputted thereto. The AND22 outputs the data write signal WR2 to the second address counter 330 through the OR2 when the selection signal I/O is in the L level.

Next, an operation of the third preferred embodiment will be explained hereinafter.

(case 1: selection signal I/O is the H level)

When the selection signal I/O is in the H level, the buffer BUF1 and the buffer BUF3 are enabled. Accordingly, the first port 310I/O functions as the input port and the second port 310O/I serves as the output port.

When the selection signal I/O is in the H level, the AND11 and the AND21 are enabled. Therefore, the data write signal WR1 is applied to the first address counter 320 and the data read signal RD2 is applied to the second address counter 330.

In this case, the data applied to the data bus IN/OUT is written into the dual port RAM 310 through the buffer BUF1 according to the address which is output by the first address counter 320.

On the other hand, the data stored in the dual port RAM 310 is read out to the data bus OUT/IN through the buffer BUF3 according to the address which is output by the second address counter 330.

(case2: selection signal I/O is the L level)

When the selection signal I/O is in the L level, the buffer BUF2 and the buffer BUF4 are enabled. Accordingly, the first port 310I/O functions as the output port and the second port 310O/I serves as the input port.

When the selection signal I/O is in the L level, the AND12 and the AND22 are enabled. Therefore, the data read signal RD1 is applied to the first address counter 320 and the data write signal WR2 is applied to the second address counter 330.

In this case, the data applied to the data bus OUT/IN is written into the dual port RAM 310 through the buffer BUF4 according to the address which is output by the second address counter 330.

On the other hand, the data stored in the dual port RAM 310 is read out to the data bus IN/OUT through the buffer BUF2 according to the address which is output by the first address counter 320.

As explained above, since the FIFO memory 300 has a selector SEL1, SEL2, the buffers BUF1 through BUF4, the port 310I/O and the port 310O/I respectively serves as both the input port and the output port. Therefore, it is possible to operate as a FIFO memory dealing with bidirectional data flow.

While the preferred form of the present invention has been described, it is to be understood that modifications will be apparent to those skilled in the art without departing from the spirit of the invention. For example, the dual port RAM is used in the preferred embodiments, however, the present invention is not limited to such a structure. A register which has two independent ports may be used in the present invention. The scope of the invention, therefore, is to be determined solely by the following claims.

What is claimed is:

1. A first-in, first-out memory circuit for storing data comprising:

a first memory part which has a plurality of first address locations each having a first word length and each storing a data therein in response to an enable signal and first and second write address signals, and which has a first input port for receiving an input data and a first output port for outputting the data stored in the first address locations;

a second memory part which has a plurality of second address locations each having the first word length and each storing a data therein in response to the enable signal and the first and second write address signals, and which has a second input port for receiving the input data and a second output port for outputting the data stored in the second address locations, wherein each of the second address locations corresponds to the respective first address locations;

a first write address counter which outputs the first write address signal designating even numbers of the first and second address locations and a first memory part selection signal in response to a channel selection signal;

a second write address counter which outputs the second write address signal designating odd numbers of the first and second address locations and a second memory part selection signal in response to the channel selection signal;

a selector circuit, coupled to said first and second write address counters, which receives the first and second write address signals and the first and second memory part selection signals, which transfers either one of the first write address signal or the second write address signal to said first and second memory parts in response to the channel selection signal, and which transfers either one of the first memory part selection signal or the second memory part selection signal to a memory part enable circuit in response to the channel selection signal; and said memory part enable circuit, coupled between said selector circuit and said first and second memory parts, which receives the first and second memory part selection signals, and which outputs the enable signal to said first and second memory parts alternately.

2. The first-in, first-out memory circuit as set forth in claim 1, wherein said first write address counter successively outputs the first write address signal so as to successively designate the same address location in the first and second memory parts.

3. The first-in, first-out memory circuit as set forth claim 2, wherein said first write address counter outputs the first memory part selection signal which toggles between a first voltage level and a second voltage level in a first data mode.

4. The first-in, first-out memory circuit as set forth claim 3, wherein said memory part enable circuit outputs the enable signal to said second memory part according to the first voltage level of the first memory part selection signal and outputs the enable signal to said first memory part according to the second voltage level of the first memory part selection signal in the first data mode.

5. The first-in, first-out memory circuit as set forth claim 1, wherein the first memory part selection signal is the least significant bit of said first write address counter.

6. A first-in, first-out memory circuit as set forth in claim 1, wherein the channel selection signal has a first voltage level and a second voltage level, wherein said first write address counter outputs the first write address signal according to the second voltage level of the channel selection signal and said selector circuit transfers the first write address signal from the first write address counter to said first and second memory parts according to the second voltage level of the channel selection signal, and wherein said second write address counter outputs the second write address signal according to the first voltage level of the channel selection signal and said selector circuit transfers the second write address signal from the second write address counter to said first and second memory parts according to the first voltage level of the channel selection.

* * * * *